US012604299B2

(12) United States Patent
Ma et al.

(10) Patent No.: US 12,604,299 B2
(45) Date of Patent: Apr. 14, 2026

(54) SIGNAL TRANSMITTING METHOD AND APPARATUS, SIGNAL RECEIVING METHOD AND APPARATUS, DEVICE AND STORAGE MEDIUM

(71) Applicant: ZTE Corporation, Shenzhen (CN)

(72) Inventors: Xuan Ma, Shenzhen (CN); Mengzhu Chen, Shenzhen (CN); Jun Xu, Shenzhen (CN); Focai Peng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 330 days.

(21) Appl. No.: 18/271,949

(22) PCT Filed: Dec. 29, 2021

(86) PCT No.: PCT/CN2021/142567
§ 371 (c)(1),
(2) Date: Jul. 12, 2023

(87) PCT Pub. No.: WO2022/151979
PCT Pub. Date: Jul. 21, 2022

(65) Prior Publication Data
US 2024/0089921 A1      Mar. 14, 2024

(30) Foreign Application Priority Data
Jan. 15, 2021    (CN) .......................... 202110057515.5

(51) Int. Cl.
| | |
|---|---|
| *H04W 68/02* | (2009.01) |
| *H04L 1/00* | (2006.01) |
| *H04L 5/00* | (2006.01) |
| *H04W 72/232* | (2023.01) |

(52) U.S. Cl.
CPC ........... *H04W 68/02* (2013.01); *H04L 1/0038* (2013.01); *H04L 5/0051* (2013.01); *H04W 72/232* (2023.01)

(58) Field of Classification Search
None
See application file for complete search history.

(56) References Cited

U.S. PATENT DOCUMENTS

| | | | | |
|---|---|---|---|---|
| 11,419,093 | B2 * | 8/2022 | Babaei .................. | H04W 72/23 |
| 2023/0209464 | A1 * | 6/2023 | Tsai .................. | H04W 52/0216 |
| | | | | 370/311 |
| 2023/0397115 | A1 * | 12/2023 | Maleki .............. | H04W 52/0235 |
| 2024/0080802 | A1 * | 3/2024 | Wu ..................... | H04W 68/025 |

FOREIGN PATENT DOCUMENTS

| | | |
|---|---|---|
| CN | 109309555 A | 2/2019 |
| CN | 110831122 A | 2/2020 |

(Continued)

OTHER PUBLICATIONS

Chinese Office Action for corresponding application 202110057515.5; Report dated Mar. 27, 2024.

(Continued)

*Primary Examiner* — Srinivasa R Reddivalam
(74) *Attorney, Agent, or Firm* — CANTOR COLBURN LLP

(57) ABSTRACT

Provided are a signal sending method and apparatus, a signal receiving method and apparatus, a device, and a storage medium. The signal receiving method includes: receiving a paging early indication (PEI) signal before a paging occasion (PO), where the PEI signal is used for indicating to a user equipment (UE) whether to receive the PO in a paging cycle; and performing a predefined operation based on the PEI signal.

12 Claims, 4 Drawing Sheets

Receive a PEI signal before a PO, where the PEI signal is used for indicating to a UE whether to receive the PO in a paging cycle — S11

Perform a predefined operation based on the PEI signal — S12

(56) References Cited

FOREIGN PATENT DOCUMENTS

| CN | 110831125 | A | 2/2020 |
| CN | 113163476 | A | 7/2021 |
| WO | 2020143707 | A1 | 7/2020 |
| WO | 2020216242 | A1 | 10/2020 |
| WO | 2020231182 | A1 | 11/2020 |

OTHER PUBLICATIONS

Chinese Search Report for corresponding application 202110057515. 5; Report dated Mar. 27, 2024.

CMCC, "Discussion on paging enhancement", 3GPP TSG RAN WG1 #103-e, e-Meeting, Oct. 26-Nov. 13, 2020, R1-2008021.

VIVO, "Paging enhancements for idle/inactive mode UE power saving" 3GPP TSG RAN WG1#103-e, e-Meeting, Oct. 26-Nov. 13, 2020 R1-2007673.

International Search Report for corresponding application PCT/CN2021/142567 filed Dec. 29, 2021.

MediaTek Inc., "Evaluation methodology and paging enhancements for idle/inactive mode UE power saving" 3GPP TSG RAN WG1 #102-e R1-2005615 e-Meeting, Aug. 17-28, 2020.

MediaTek Inc., "Paging Enhancements for UE Power Saving in NR", 3GPP TSG-RAN WG2 Meeting #111 electronic R2-2008361 Online, Aug. 17-28, 2020.

Moderator (MediaTek), "Summary for Paging Enhancements" 3GPP TSG RAN WG1 e-Meeting #104 R1-2101948 e-Meeting, Jan. 25-Feb. 5, 2021.

* cited by examiner

Window where a base station
sends a PEI

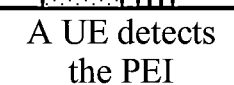

SSB   PEI                                                    PO

A UE detects          The base station
the PEI             sends the PEI, but
the UE does not
detect the PEI

FIG. 3

Window where a base station
sends a PEI

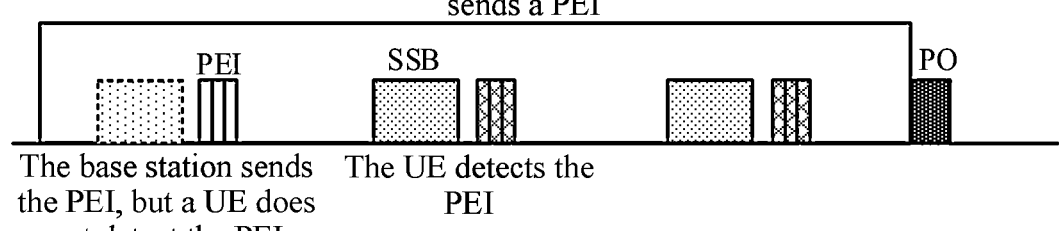

PEI           SSB                                    PO

The base station sends    The UE detects the
the PEI, but a UE does          PEI
not detect the PEI

FIG. 4

Window where a base station
sends a PEI

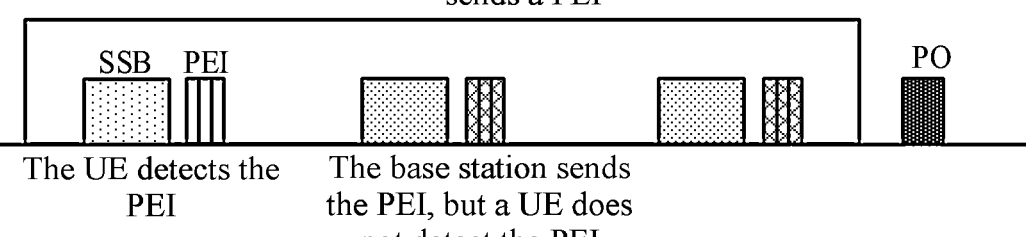

SSB   PEI                                            PO

The UE detects the      The base station sends
PEI             the PEI, but a UE does
not detect the PEI

FIG. 5

SIGNAL TRANSMITTING METHOD AND APPARATUS, SIGNAL RECEIVING METHOD AND APPARATUS, DEVICE AND STORAGE MEDIUM

CROSS-REFERENCE TO RELATED APPLICATIONS

This is a National Stage Application filed under 35 U.S.C. 371 based on International Patent Application No. PCT/CN2021/142567, filed on Dec. 29, 2021, which claims priority to Chinese Patent Application No. 202110057515.5 filed on Jan. 15, 2021, the disclosures of both of which are incorporated herein by reference in their entireties.

TECHNICAL FIELD

The present application relates to the technical field of communications, for example, a signal sending method and apparatus, a signal receiving method and apparatus, a device, and a storage medium.

BACKGROUND

As described in the protocols of the 3rd Generation Partnership Project (3GPP) in the related art, a user equipment (UE) needs to monitor one paging occasion (PO) in each paging cycle (PC) in both a Radio Resource Control IDLE (RRC_IDLE) state and a Radio Resource Control INACTIVE (RRC_INACTIVE) state. However, it is uncertain that the terminal has a paging message in each paging cycle. In particular, for a UE with a low paging probability, a large amount of unnecessary paging reception results in high power consumption.

SUMMARY

The present application provides a signal sending method and apparatus, a signal receiving method and apparatus, a device, and a storage medium to reduce power consumption caused by paging reception.

In the first aspect, an embodiment of the present application provides a signal receiving method. The method is applied by a UE and includes the following:

A paging early indication (PEI) signal is received before a PO, where the PEI signal is used for indicating whether the UE receives the PO in a paging cycle.

A predefined operation is performed based on the PEI signal.

In the second aspect, an embodiment of the present application provides a signal sending method. The method is applied by a base station and includes the following:

A PEI signal is sent before a PO, where the PEI signal is used for instructing a UE to perform a predefined operation based on the PEI signal.

In the third aspect, an embodiment of the present application provides a signal receiving method. The method is applied by a UE and includes the following:

An indication of a data transmission resource is received, where the data transmission resource includes a physical downlink shared channel (PDSCH) and a physical downlink control channel (PDCCH).

An indication of a first resource is received.

When the data transmission resource overlaps with the first resource, whether to receive data is determined according to a priority of the data transmission resource and a priority of the first resource.

In the fourth aspect, an embodiment of the present application provides a signal receiving apparatus. The apparatus is configured in a UE and includes a receiving module and an execution module.

The receiving module is configured to receive a PEI signal before a PO, where the PEI signal is used for indicating whether the UE receives the PO in a paging cycle.

The execution module is configured to perform a predefined operation based on the PEI signal.

In the fifth aspect, an embodiment of the present application provides a signal sending apparatus. The apparatus is configured in a base station and includes a sending module.

The sending module is configured to send a PEI signal before a PO, where the PEI signal is used for instructing a UE to perform a predefined operation based on the PEI signal.

In the sixth aspect, an embodiment of the present application provides a signal receiving apparatus.

The apparatus is configured in a UE and includes a second receiving module and a determination module.

The second receiving module is configured to receive an indication of a data transmission resource and an indication of a first resource, where the data transmission resource includes a PDSCH and a PDCCH.

The determination module is configured to, when the data transmission resource overlaps with the first resource, determine, according to a priority of the data transmission resource and a priority of the first resource, whether to receive data.

In the seventh aspect, an embodiment of the present application provides a device. The device includes at least one processor and a memory.

The memory is configured to store at least one program.

The at least one program is executed by the at least one processor to cause the at least one processor to perform any one of the methods according to embodiments of the present application.

In the eighth aspect, an embodiment of the present application provides a non-transitory computer readable storage medium. The non-transitory computer readable storage medium is configured to store a computer program which, when executed by a processor, causes the processor to perform any one of the methods according to embodiments of the present application.

The preceding embodiments and other aspects of the present application and implementations thereof are described in more detail in the brief description of drawings, detailed description, and claims.

BRIEF DESCRIPTION OF DRAWINGS

FIG. 3 is a schematic diagram of a PEI sending window according to an embodiment of the present application.

FIG. 4 is a schematic diagram of another PEI sending window according to an embodiment of the present application.

FIG. 5 is a schematic diagram of another PEI sending window according to an embodiment of the present application.

DETAILED DESCRIPTION

Figure 1:
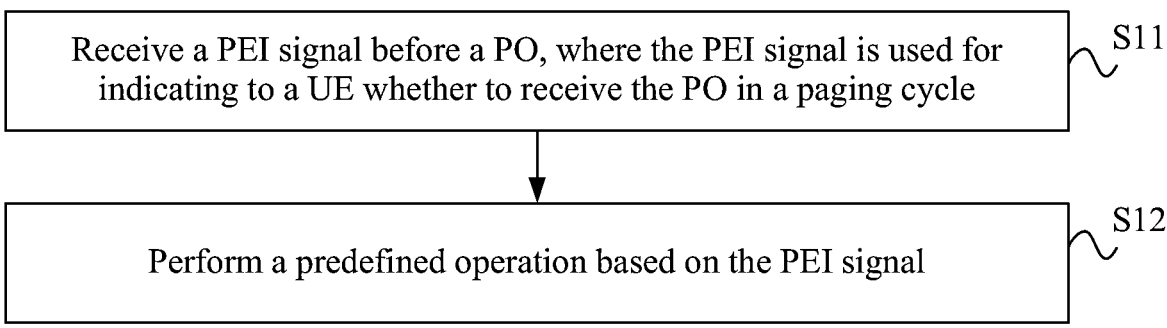
FIG. 1 is a flowchart of a signal receiving method according to an embodiment of the present application.

Hereinafter embodiments of the present application are described in detail in conjunction with the drawings. It is to be noted that if not in collision, the embodiments of the present application and features therein may be combined with each other in any manner.

The steps illustrated in the flowcharts among the drawings may be performed by, for example, a computer system capable of executing a set of computer-executable instructions. Moreover, although logical sequences are illustrated in the flowcharts, the steps illustrated or described may be performed in sequences different from those described herein in some cases.

Technical solutions of the present application may be applied to such communications systems as Global Systems for Mobile Communications (GSMs), code-division multiple access (CDMA) systems, wideband code-division multiple access (WCDMA) systems, General Packet Radio Services (GPRSs), Long Term Evolution (LTE) systems, Long Term Evolution Advanced (LTE-A) systems, Universal Mobile Telecommunications Systems (UMTSs), and the 5th generation wireless systems (5G), which are not limited in the embodiments of the present application. In the present application, a 5G system is used as an example.

In the embodiments of the present application, a base station may be a device capable of communicating with a user terminal. The base station may be any device having a radio transceiving function. The base station includes, but is not limited to, a NodeB, an evolved NodeB (eNodeB), a base station in a 5G communication system, a base station in a future communication system, an access node in a Wi-Fi system, a wireless relay node, and a wireless backhaul node. The base station may also be a radio controller in a Cloud Radio Access Network (C-RAN). The base station may also be a small station and a transmission reception point (TRP), which is not limited in the embodiments of the present application. In the present application, a 5G base station is used as an example.

In the embodiments of the present application, the user terminal is a device having a radio transceiving function, which may be deployed on land, including an indoor or outdoor device, a handheld device, a wearable device, or an in-vehicle device, may be deployed on water (such as a ship), or may be deployed in the air (such as an airplane, a balloon, and a satellite). The user terminal may be a mobile phone, a Pad, a computer with a radio transceiving function, a virtual reality (VR) terminal, an augmented reality (AR) terminal, a wireless terminal in industrial control, a wireless terminal in self-driving, a wireless terminal in remote medical services, a wireless terminal in a smart grid, a wireless terminal in transportation safety, a wireless terminal in a smart city, and a wireless terminal in smart home. Application scenarios are not limited in the embodiments of the present application. The user terminal may sometimes be referred to as a terminal, an access terminal, a UE unit, a UE station, a mobile station, a mobile platform, a remote station, a remote terminal, a mobile device, a UE terminal, a wireless communication device, a UE agent, or a UE apparatus. This is not limited in the embodiments of the present application.

A UE in an RRC_IDLE state or an RRC_INACTIVE state needs to monitor a PO in each paging cycle. The PO includes multiple PDCCH monitor occasions. A PDCCH detected by the UE on the PO is referred to as paging downlink control information (paging DCI), and information carried by a PDSCH scheduled by the paging DCI is referred to as a paging message. To successfully detect the paging DCI and the paging message, the UE needs to complete synchronization, automatic gain control (AGC), and other operations before the PO. The UE needs to perform one measurement in each paging cycle. Therefore, the UE needs to process one or more SSBs before the PO. The number of SSBs processed by the UE may vary with a channel condition. The distance between the PO and an SSB may be different for different UEs.

A paging frame (PF) and the PO for paging are determined by the formulas below.

A system frame number (SFN) of the PF satisfies the following condition:

$$(SFN+PF\_offset) \times T = (T/N) \times (UE\_ID \times N).$$

SFN denotes the system frame number of the PF, PF_offset denotes an offset for the PF, UE_ID denotes an identification (ID) number of the UE, and T denotes a discontinuous reception (DRX) cycle. N denotes the number of PFs within the DRX cycle.

An index number i_s indicating the PO is determined by the following formula: $I\_s = floor(UE\_ID/N) \times Ns$.

UE_ID denotes the ID number of the UE, i_s denotes the index number indicating the PO, floor (·) denotes a floor function, N denotes the number of PFs within the DRX cycle, and Ns denotes the number of POs in the PF.

$UE\_ID = 5G\text{-}S\text{-}TMSI \times 1024$, where 5G-S-TMSI is a bit string with a length of 48 bits.

If a channel characteristic on one antenna port can be derived from another antenna port, it is considered that the two ports are quasi co-located (QCL), and a channel estimation result obtained from one port may be used for the other port.

Four types of QCL are present: QCL-TypeA has the characteristics of a Doppler shift, Doppler spread, an average delay, and delay spread to obtain channel estimation information; QCL-TypeB has the characteristics of a Doppler shift and Doppler spread to obtain channel estimation information; QCL-TypeC has the characteristics of a Doppler shift and an average delay to obtain measurement information such as reference signal received power (RSRP); and QCL-TypeD has the characteristic of a spatial receive antenna parameter to assist the UE in beamforming.

To reduce the power consumption of the UE due to the reception of an unnecessary PO, a paging early indication (PEI) signal may be introduced before the PO, and the PEI signal may inform the UE in advance of whether the UE needs to be waken up to receive the PO. Different positions of a PEI relative to the PO and an SSB cause different power saving effects. A proper configuration can obtain a relatively good power saving gain. An unreasonable configuration greatly reduces the power saving gain and even causes a negative effect.

The PEI signal is introduced before the PO so that before receiving the PO, the UE can be notified of whether the UE needs to be waken up to receive the PO in one or more paging cycles. If the UE does not need to receive the PO, the UE may maintain or enter a sleep state, thereby reducing power consumption due to reception of the PO, and additional power consumption required for switching from the sleep state to a PO receiving state and switching from the PO receiving state to the sleep state (referred to as ramping up and ramping down) may also be reduced. A time domain position of the PEI signal plays an important role in saving the power consumption of the UE. If an inappropriate PEI position is configured, to receive the PEI, the UE may need to additionally increase the power consumption for ramping up and ramping down. Thus, the power saving effect is reduced, and even a reverse effect occurs. Reasonably configuring the PEI position is a key factor for power saving of the UE.

In implementations, the UE needs to process one or more SSBs before receiving the PO to implement synchronization, AGC, (intra-frequency or inter-frequency) cell measurement, and serving cell measurement.

The UE requires different numbers of SSBs under different channel conditions. For example, a UE in the center of a cell has a relatively good channel condition and requires a small number of SSBs, such as one SSB, to achieve synchronization and measurement. Therefore, the UE needs to process only one SSB before the PO. A UE at the edge of the cell has a poor channel condition, and it is possible that one SSB cannot satisfy an accuracy requirement of synchronization. In this case, the UE needs to process multiple SSBs to meet the requirements for synchronization and measurement.

In different scenarios, the UE performs different operations (including processing different numbers of SSBs) in one paging cycle, and positions of the PEI corresponding to the best power saving gain are also different.

UEs of different types or with different capabilities may require different numbers of SSBs. For example, UEs with four, two, or one receive antenna need to process different numbers of SSBs, and positions of the PEI corresponding to the best power saving gain are also different. For example, a common UE and a reduced capability UE (RedCap UE) need to process different numbers of SSBs, and positions of the PEI corresponding to the best power saving gain are also different.

Therefore, a fixed PEI position cannot satisfy the requirements. Based on this, the present application proposes a signal sending method and apparatus, a signal receiving method and apparatus, a device, and a storage medium so that as high a power saving gain as possible can be obtained on the premise of as low a resource overhead as possible and as low complexity as possible.

The signal sending method and apparatus, the signal receiving method and apparatus, the device, and the storage medium are described in detail in conjunction with the embodiments below.

One embodiment provides a signal receiving method applied by a UE. The signal receiving method is applicable to the case where multiple PEI time domain positions are determined. As shown in FIG. 1, the signal receiving method provided by the embodiment of the present application mainly includes S11 and S12.

In S11, a PEI signal is received before a PO, where the PEI signal is used for indicating whether the UE receives the PO in a paging cycle.

In S12, a predefined operation is performed based on the PEI signal.

In an embodiment, the predefined operation includes one or more of the operations below.

The PO is received.

The PO is not received.

Paging DCI is received.

In an embodiment, that the PEI signal is received before the PO includes that the PEI signal is received at a PEI time-frequency resource position within a PEI receiving window.

In an embodiment, the PEI signal further includes one or more of the following information: an indication of a reference signal resource or a reference signal resource set; whether to receive a broadcast/multicast message; or an indication of a system message update.

In an embodiment, information about the PEI receiving window is configured by a base station according to one or more of the following information: a UE capability, a UE type, or DRX configuration information.

The information about the PEI receiving window includes one or more of a starting position of the PEI receiving window, an ending position of the PEI receiving window, or a duration of the PEI receiving window.

In an embodiment, the ending position of the PEI receiving window is a starting position of the PO; or the ending position of the PEI receiving window is before a starting position of the PO.

In an embodiment, the duration of the PEI receiving window is associated with an SSB period: the duration of the PEI receiving window is equal to N SSB periods plus an offset, where N≥0, and the offset is greater than or equal to 0.

In an embodiment, a time domain position of the PEI signal is determined by an SSB associated with the PEI signal.

In an embodiment, that the PEI signal is received at the PEI time-frequency resource position within the PEI receiving window includes one or more of the following:

The PEI signal is received at the first PEI receiving position within the PEI receiving window.

The PEI signal is received at a first preset position within the PEI receiving window, where the first preset position is related to an SSB associated with the PEI.

The PEI signal is received at a second preset position within the PEI receiving window, where the second preset position is determined based on the number of SSBs processed before a PO in the last paging cycle.

The PEI signal is received at a third preset position within the PEI receiving window, where the third preset position is determined based on a measurement result in the last one or more paging cycles.

In an embodiment, the time domain position of the PEI signal is associated with the N-th SSB before the PO, where N is a positive integer.

In an embodiment, the SSB associated with the PEI signal satisfies one or more of the conditions below.

The associated SSB has a shortest distance from the PEI signal.

The associated SSB and the PEI signal have a quasi co-location relationship.

The associated SSB and the PEI signal have the same beam direction or the same quasi co-location type.

The associated SSB and the PEI signal have the same index.

An index of the associated SSB and an index of the PEI signal are arranged at the same position.

The associated SSB is configured by higher-layer signaling or a system message.

The associated SSB is determined in a predefined manner.

In an embodiment, a position relationship between the PEI signal and the SSB associated with the PEI signal is determined by one or more of the following parameters: a carrier frequency, a subcarrier spacing, an SSB pattern, an SSB period, an SSB index, a multiplexing pattern between an SSB and a control resource set (CORESET), or a spectrum type.

In an embodiment, a transmission position of the PEI signal and a transmission position of the SSB associated with the PEI signal include one or more of the following:

The PEI signal and the SSB associated with the PEI signal are transmitted in the same slot.

The transmission position of the PEI signal is before the transmission position of the SSB associated with the PEI signal.

The transmission position of the PEI signal is after the transmission position of the SSB associated with the PEI signal.

The PEI signal and the SSB associated with the PEI signal are transmitted in the same half-frame.

In an embodiment, the distance between the PEI signal and the SSB associated with the PEI signal includes one or more of the following: the distance between a starting position of the PEI signal and a starting position of the SSB associated with the PEI; the distance between a starting position of the PEI signal and a position of an SSB having the same beam direction as the PEI; or the distance between a starting position of the PEI signal and a specified index position of the SSB associated with the PEI.

In an embodiment, the distance between the PEI signal and the SSB associated with the PEI signal is determined by a first parameter, where the first parameter includes one or more of the following:

The first parameter is a number greater than or equal to 0.

The first parameter is any natural number.

The first parameter is determined in a predefined manner.

The first parameter is determined by a higher-layer parameter.

The first parameter is determined by the UE capability.

The first parameter is determined by a DRX parameter.

In an embodiment, N is determined within a specified range, where the specified range is configured by a higher-layer parameter, determined by a predefinition, or indicated by DCI.

In an embodiment, N is determined within the specified range based on one or more of the following parameters: a channel measurement result or a channel condition.

In an embodiment, the N-th SSB before the PO, which is associated with the PEI, includes one or more of: an SSB within the N-th SSB Measurement Timing Configuration (SMTC) window; the N-th SSB burst; or an SSB with an SSB index in the N-th SSB burst.

In an embodiment, the time domain position of the PEI signal is related to a pre-configured reference point before the PO.

In an embodiment, the reference point includes the following:

The reference point is determined by a higher-layer parameter.

The distance between the reference point and the PO is an integer number of SSB periods plus an offset.

The reference point satisfies that SFN mod M=0, where M is a positive integer.

In an embodiment, the time domain position of the PEI signal is determined based on the distance between the PEI signal and the reference point.

In an embodiment, a relationship between the PEI signal and the reference point includes at least one of the following:

An SSB exists between the starting position of the PEI signal and the reference point.

An SSB exists between an ending position of the PEI signal and the reference point.

An SSB exists between the PO and the reference point.

In an embodiment, the distance between the PEI signal and the reference point is determined by a second parameter, where the second parameter includes one or more of the following:

The second parameter is a number greater than or equal to 0.

The second parameter is any natural number.

The second parameter is determined in a predefined manner.

The second parameter is determined by a higher-layer parameter.

The second parameter is determined by a DRX parameter.

In an embodiment, the method further includes the following:

When the PEI signal is not detected on a PEI time-frequency domain resource or no detection opportunities exist in the paging cycle, the UE receives the PO.

Alternatively, when the PEI signal is not detected on a PEI time-frequency domain resource or no detection opportunities exist in the paging cycle, the UE does not receive the PO.

Alternatively, when the PEI signal is not detected on a PEI time-frequency domain resource or no detection opportunities exist in the paging cycle, whether the UE receives the PO is determined by a higher-layer parameter.

In an embodiment, no PEI detection opportunities include that at least one or all of the PEI detection opportunities collide or overlap with at least one of the following resources: an SSB resource; an SMTC window; a measurement gap; a positioning reference signal; a system message; a random access response window; CORESET 0; or a pre-configured time-frequency resource.

In an embodiment, the method further includes the following.

In the case where a resource overlap occurs between a PEI time-frequency resource and a non-PEI time-frequency resource, a predefined operation is performed based on a resource overlap situation.

In an embodiment, that the predefined operation is performed based on the resource overlap situation includes the following:

A signal with a high priority is received according to predefined priorities, where the predefined priorities include one or more of the cases below.

When the PEI time-frequency resource overlaps with a PDSCH time-frequency resource, a priority of the PEI signal and a priority of a PDSCH are determined by a type of information carried by the PDSCH and a type of a radio network temporary identifier (RNTI) that scrambles a PDCCH for scheduling the PDSCH.

When a resource overlap occurs between the PEI time-frequency resource and a random access response window, a priority of the PEI signal and a priority of an access response are determined by a reason for triggering the random access response window.

In an embodiment, in the case where the PEI signal is indicated by DCI, that a corresponding operation is performed based on the resource overlap situation includes one or more of the following:

When a resource overlap occurs between the PEI and another signaling and/or signal, the PO is monitored.

When a resource overlap occurs between the PEI and another signaling and/or signal, whether to monitor the PO is determined based on a higher-layer configuration.

Figure 2A:
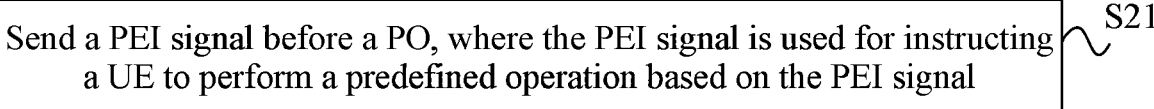
FIG. 2A is a flowchart of a signal sending method according to an embodiment of the present application.

One embodiment provides a signal sending method applied by a base station. The signal sending method is applicable to the case where multiple PEI time domain positions are determined. As shown in FIG. 2A, the signal sending method provided by the embodiment of the present application mainly includes S21.

In S21, a PEI signal is sent before a PO, where the PEI signal is used for instructing a UE to perform a predefined operation based on the PEI signal.

In an embodiment, the predefined operation includes one or more of the operations below.

The PO is received.

The PO is not received.

Paging DCI is received.

In an embodiment, that the PEI signal is sent before the PO includes that the PEI signal is sent at a PEI time-frequency resource position within a PEI sending window.

In an embodiment, the PEI signal further includes one or more of the following information: an indication of a reference signal resource or a reference signal resource set; whether to receive a broadcast/multicast message; or an indication of a system message update.

In an embodiment, that the PEI signal is sent at the PEI time-frequency resource position within the PEI sending window includes the following.

The PEI signal is sent at a preset period at the PEI time-frequency resource position within the PEI sending window.

In an embodiment, the preset period is a multiple of an SSB period.

In an embodiment, that the PEI signal is sent before the PO includes that the PEI is sent at a PEI position associated with the N-th SSB before the PO.

In an embodiment, information about the PEI sending window is configured by the base station according to one or more of the following information: a UE capability, a UE type, or DRX configuration information.

The information about the PEI sending window includes one or more of a starting position of the PEI sending window, an ending position of the PEI sending window, or a duration of the PEI sending window.

In an embodiment, the ending position of the PEI sending window is a starting position of the PO; or the ending position of the PEI sending window is before a starting position of the PO.

In an embodiment, the duration of the PEI sending window is associated with the SSB period: the duration of the PEI sending window is equal to N SSB periods plus an offset, where $N \geq 0$, and the offset is greater than or equal to 0.

In an embodiment, a time domain position of the PEI signal is determined by an SSB associated with the PEI signal.

In an embodiment, that the PEI signal is received at the PEI time-frequency resource position within the PEI sending window includes one or more of the following.

The PEI signal is received at the first PEI receiving position within the PEI sending window.

The PEI signal is received at a first preset position within the PEI sending window, where the first preset position is related to an SSB associated with the PEI.

The PEI signal is received at a second preset position within the PEI sending window, where the second preset position is determined based on the number of SSBs processed before a PO in the last paging cycle.

The PEI signal is received at a third preset position within the PEI sending window, where the third preset position is determined based on a measurement result in the last one or more paging cycles.

In an embodiment, the time domain position of the PEI signal is associated with the N-th SSB before the PO, where N is a positive integer.

In an embodiment, the SSB associated with the PEI signal satisfies one or more of the conditions below.

The associated SSB has a shortest distance from the PEI signal.

The associated SSB and the PEI signal have a quasi co-location relationship.

The associated SSB and the PEI signal have the same beam direction or the same quasi co-location type.

The associated SSB and the PEI signal have the same index.

An index of the associated SSB and an index of the PEI signal are arranged at the same position.

The associated SSB is configured by higher-layer signaling or a system message.

The associated SSB is determined in a predefined manner.

In an embodiment, a position relationship between the PEI signal and the SSB associated with the PEI signal is determined by one or more of the following parameters: a carrier frequency, a subcarrier spacing, an SSB pattern, an SSB period, an SSB index, a multiplexing pattern between an SSB and a CORESET, or a spectrum type.

In an embodiment, a transmission position of the PEI signal and a transmission position of the SSB associated with the PEI signal include one or more of the following.

The PEI signal and the SSB associated with the PEI signal are transmitted in the same slot.

The transmission position of the PEI signal is before the transmission position of the SSB associated with the PEI signal.

The transmission position of the PEI signal is after the transmission position of the SSB associated with the PEI signal.

The PEI signal and the SSB associated with the PEI signal are transmitted in the same half-frame.

In an embodiment, the distance between the PEI signal and the SSB associated with the PEI signal includes one or more of the following: the distance between a starting position of the PEI signal and a starting position of the SSB associated with the PEI; the distance between a starting position of the PEI signal and a position of an SSB having the same beam direction as the PEI; or the distance between a starting position of the PEI signal and a specified index position of the SSB associated with the PEI.

In an embodiment, the distance between the PEI signal and the SSB associated with the PEI signal is determined by a first parameter, where the first parameter includes one or more of the following.

The first parameter is a number greater than or equal to 0.

The first parameter is any natural number.

The first parameter is determined in a predefined manner.

The first parameter is determined by a higher-layer parameter.

The first parameter is determined by the UE capability.

The first parameter is determined by a DRX parameter.

In an embodiment, N is determined within a specified range, where the specified range is configured by a higher-layer parameter, determined by a predefinition, or indicated by DCI.

In an embodiment, N is determined within the specified range based on one or more of the following parameters: a channel measurement result or a channel condition.

In an embodiment, the N-th SSB before the PO, which is associated with the PEI, includes one or more of: an SSB in the N-th SMTC window; the N-th SSB burst; or an SSB with an SSB index in the N-th SSB burst.

In an embodiment, that the PEI signal is sent before the PO includes that the PEI is sent at a PEI position associated with a reference point before the PO.

In an embodiment, the reference point includes the following.

The reference point is determined by a higher-layer parameter.

The distance between the reference point and the PO is an integer number of SSB periods plus an offset.

The reference point satisfies that SFN mod M=0, where M is a positive integer.

In an embodiment, the time domain position of the PEI signal is determined based on the distance between the PEI signal and the reference point.

In an embodiment, a relationship between the PEI signal and the reference point includes at least one of the following.

An SSB exists between the starting position of the PEI signal and the reference point.

An SSB exists between an ending position of the PEI signal and the reference point.

An SSB exists between the PO and the reference point.

In an embodiment, the distance between the PEI signal and the reference point is determined by a second parameter, where the second parameter includes one or more of the following.

The second parameter is a number greater than or equal to 0.

The second parameter is any natural number.

The second parameter is determined in a predefined manner.

The second parameter is determined by a higher-layer parameter.

The second parameter is determined by the UE capability.

The second parameter is determined by a DRX parameter.

In an embodiment, information indicated by the PEI includes at least one of the following: whether to receive m POs; whether to receive the paging DCI; whether to receive a paging PDSCH or a paging message; whether to receive the broadcast/multicast message; the indication of the reference signal resource or the reference signal resource set; or the indication of the system message update.

The indication of the reference signal resource or the reference signal resource set includes one of the following: whether the reference signal resource or the reference signal resource set exists; whether the UE needs to perform blind detection on the reference signal resource or the reference signal resource set; or whether the reference signal resource or the reference signal resource set is updated or activated or deactivated.

Figure 2B:
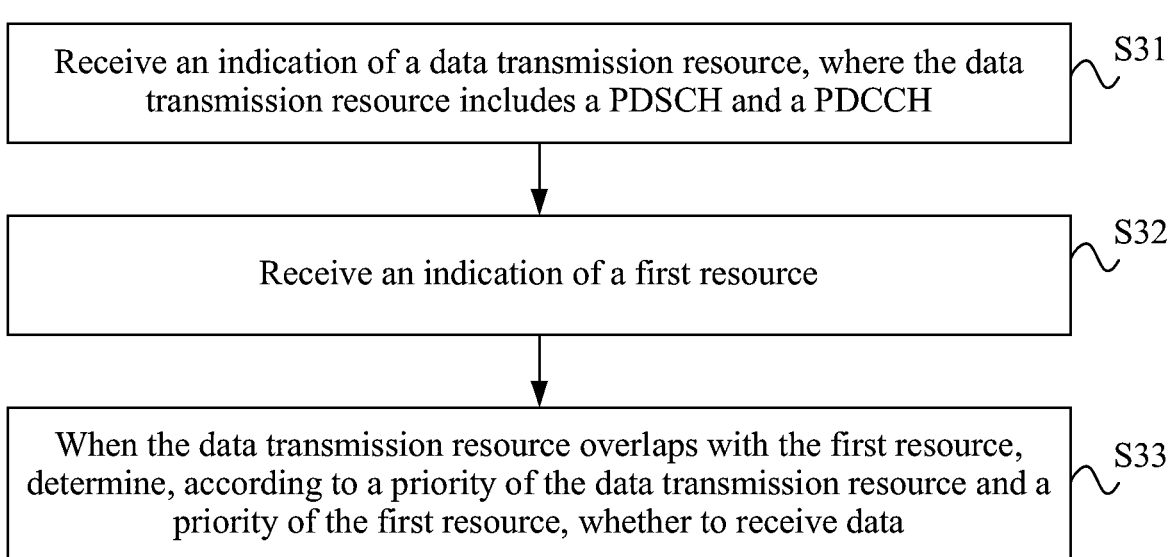
FIG. 2B is a flowchart of a signal receiving method according to an embodiment of the present application.

One embodiment provides a signal receiving method applied by a UE. The signal receiving method is applicable to the case where how to process a resource collision or overlap is determined. As shown in FIG. 2B, the signal receiving method provided by the embodiment of the present application mainly includes S31, S32, and S33. The UE works in a connected state.

In S31, an indication of a data transmission resource is received, where the data transmission resource includes a PDSCH and a PDCCH.

In S32, an indication of a first resource is received.

In S33, when the data transmission resource overlaps with the first resource, whether to receive data is determined according to a priority of the data transmission resource and a priority of the first resource.

In an embodiment, the first resource is related to a PEI signal.

In an embodiment, the priority of the data transmission resource and the priority of the first resource include one or more of the cases below.

When the data transmission resource is a PDSCH data transmission resource, the priority of the data transmission resource and the priority of the first resource are determined by at least one of a type of information carried by the PDSCH, a type of an RNTI that scrambles a PDCCH for scheduling the PDSCH, or a trigger manner.

When the data transmission resource is a random access response window, the priority of the data transmission resource and the priority of the first resource are determined by a reason for triggering the random access response window.

When the data transmission resource is a PDCCH data transmission resource, the priority of the data transmission resource and the priority of the first resource are determined by at least one of a type of information carried by the PDCCH, a format of control information carried by the PDCCH, a type of an RNTI that scrambles the PDCCH, a control resource set related to the PDCCH, or a type of a search space related to the PDCCH.

When the data transmission resource is a reference signal time-frequency resource, the priority of the data transmission resource and the priority of the first resource are determined by at least one of a type of a reference signal, a temporal characteristic of the reference signal, or a trigger manner of the reference signal.

When the data transmission resource is an SSB time-frequency resource, the priority of the data transmission resource and the priority of the first resource are determined by a PEI-related time-frequency resource.

In one embodiment, information about a PEI receiving window is provided. The information mainly includes a meaning of the window, a size of the window, and how to perform a configuration.

It is to be noted that the PEI receiving window for a UE is equivalent to a PEI sending window for a base station, that is, the meaning, size, occupied time-frequency resource, and configuration information of the PEI receiving window are the same as those of the PEI sending window, and the PEI receiving window and the PEI sending window are just described from different angles.

The base station sends a PEI signal at a PEI time-frequency resource position within the PEI sending window. The PEI sending window is a period of time before a PO. A duration of the PEI sending window is denoted as PO_PEI_offset, that is, a duration of the PEI receiving window is equal to N SSB periods plus an offset. N is an integer. The PEI sending window may be referred to as the PEI receiving window from the perspective of the UE.

As shown in FIGS. 3 and 4, an ending position of the PEI sending window is a starting position of the PO. The UE detects the PEI signal at a corresponding time position within the PEI receiving window. If the PEI signal is successfully detected, a predefined operation is performed as indicated by the PEI signal.

As shown in FIG. 5, the PEI sending window is a distance before the PO, and the ending position of the PEI sending window is a position at a distance from the PO rather than the starting position of the PO. In this case, the distance between the ending position of the PEI sending window and the PO may be a predefined fixed value. Alternatively, the distance between the ending position of the PEI sending window and the PO is configured by a higher-layer parameter.

For example, the configuration information of the PEI sending window is related to a UE capability/UE type/DRX configuration. The configuration of the PEI sending window includes one or more of a starting position of the PEI sending window, the ending position of the PEI sending window, or the length of the PEI sending window.

For example, a network/base station side configures the PEI sending window, including the starting position of the PEI sending window, the ending position of the PEI sending window, and the length of the PEI sending window, according to the UE capability. For example, the UE capability includes at least one of the number of receive antennas, the number of transmit antennas, whether coverage enhancement is supported, or a maximum (downlink or uplink) bandwidth supported. For example, the DRX configuration includes a first type of DRX configuration or a second type of DRX configuration. The second type of DRX configuration includes a DRX cycle of greater than or equal to 1024×10 ms. The first type of DRX configuration includes a DRX cycle of less than 1024×10 ms.

PO_PEI_offset is at a millisecond level and greater than or equal to the SSB period, such as 50 ms and 80 ms. For example, the unit of PO_PEI_offset is a slot, such as 40 slots and 80 slots. A maximum value or a minimum value of PO_PEI_offset is at a millisecond level and greater than or equal to the SSB period. For example, at least one SSB has an opportunity to appear within the PEI sending window. PO_PEI_offset may be related to the SSB period, for example, PO_PEI_offset is greater than N SSB periods; or PO_PEI_offset is greater than or equal to N SSB periods, that is, it is ensured that N SSBs have opportunities to appear within the PEI sending window. For example, the maximum value or the minimum value of PO_PEI_offset is greater than N SSB periods; or the maximum value or the minimum value of PO_PEI_offset is greater than or equal to N SSB periods, that is, it is ensured that N SSBs have opportunities to appear within the PEI sending window. For example, the value of PO_PEI_offset is equal to N SSB periods plus an offset, where N≥0, and offset≥0. For example, the maximum value or the minimum value of PO_PEI_offset is equal to N SSB periods plus an offset. For example, a value range of PO_PEI_offset depends on different scenarios or UE capabilities or UE types. For example, for a common UE, PO_PEI_offset ranges from 0 to 3 SSB periods; for a RedCap UE with reduced complexity, PO_PEI_offset ranges from 0 to 5 SSB periods.

The base station periodically sends the PEI signal. For example, the base station periodically sends the PEI signal within the PEI sending window. For example, a sending period of the PEI signal is determined according to the SSB period, for example, the sending period of the PEI signal is the same as the SSB period. For example, the sending period of the PEI signal and the SSB period are each 20 ms. In this manner, it can be ensured that one PEI sending opportunity exists in the vicinity of each SSB within the PEI sending window, and each PEI position has the same distance from its adjacent SSB position. The sending period of the PEI signal is a multiple of the SSB period. For example, a maximum sending period or a minimum sending period of the PEI is a multiple of the SSB period.

For example, PEI signals sent within the same PEI sending window have completely the same content.

For example, the UE detects at least one PEI in one paging cycle.

For example, PO_PEI_offset has a fixed value, such as 60 ms. For example, the value of PO_PEI_offset is configured by a higher-layer parameter. The value configured by the higher-layer parameter is used as the size of the PEI sending window in practice. For example, the value of PO_PEI_offset is configured by the higher-layer parameter, and a range value (such as the maximum value) is configured by the higher-layer parameter, where the UE selects the actually used PEI receiving window according to an actual situation.

The PEI sending window is defined so that the problem of missed detection of UE due to the base station sending the PEI at only one position can be avoided, and the problem of additional energy consumption/resource overheads due to the need of the base station to send the PEI frequently can be avoided. An SSB receiving opportunity always exists within the PEI sending window so that the PEI position and the SSB position can be made adjacent to each other, thereby maximizing a power saving gain by increasing a sleep time. Therefore, advanced UEs (such as UEs in 3GPP Release 17 or a later version) can select/use an SSB for measurement and synchronization like old UEs (such as UEs in versions prior to 3GPP Release 17).

In one embodiment, a position relationship between the PEI signal and the SSB is provided.

To acquire a greater power saving gain, the UE should reduce an opportunity for ramping up/down as much as possible to increase the time of a deep sleep. For different UEs, the distance between an SSB before a PO and the PO is random. When the PEI is located around the SSB, the UE does not need to wake up multiple times and can process the SSB and the PEI within a centralized time so that the UE can obtain the greater power saving gain.

A time domain position of the PEI is related to an SSB associated with the PEI. For example, the position relationship between the PEI and the associated SSB is determined by at least one of a predefined manner, higher-layer signaling, a system message, a UE capability, a UE type, or a DRX parameter configuration.

For example, the associated SSB satisfies at least one of the relationships below.

The associated SSB has a shortest distance from the PEI. In the present application, when multiple SSBs are present, an SSB closest to the PEI is referred to as an SSB adjacent to the PEI.

The associated SSB and the PEI have a QCL relationship.

The associated SSB and the PEI have the same beam direction or the same quasi co-location type D (QCL-TypeD).

The associated SSB corresponds to the PEI.

The associated SSB and the PEI have the same index. For example, the PEI and the SSB are both sent by multiple beams, PEI indexes are 0 to 3 separately, and SSB indexes are 0 to 3 separately. Then, the PEI and the SSB having the same index (for example, 1) correspond.

An index of the associated SSB and an index of the PEI are arranged at the same position.

A position of the index of the associated SSB in an SSB index set is related to a position of the index of the PEI in a PEI index set. For example, if the configured SSB index set is $\{1, 3, 5\}$ and the configured PEI index set is $\{2, 4, 6\}$, an SSB with an index of 3 and a PEI with an index of 4 have the same position (the second index) in the corresponding index sets, and the SSB with an index of 3 is associated with the PEI with an index of 4.

The associated SSB is configured by higher-layer signaling or a system message.

The associated SSB is determined in a predefined manner (for example, having a minimum SSB index or a maximum SSB index).

For example, the position relationship between the PEI and the associated SSB is related to at least one of the following factors: a carrier frequency, a subcarrier spacing, an SSB pattern, an SSB period, an SSB index, a multiplexing pattern between an SSB and CORESET 0, a spectrum type, or a spectrum range. The SSB pattern depends on higher-layer signaling ssb-PositionsInBurst. For example, the spectrum type includes a licensed spectrum or an unlicensed spectrum.

For example, the PEI and the associated SSB are transmitted in the same half-frame. For example, the PEI and the associated SSB occupy different symbols in the same half-frame.

For example, the PEI and the associated SSB are transmitted in the same slot. For example, the PEI is transmitted on the first N1 symbols of a slot where the SSB is located, $1 \le N1 \le 4$. For example, the PEI is transmitted on the first one or two symbols of the slot where the SSB is located. This can ensure that an effect of PDCCH transmission is reduced (where a PDCCH is generally transmitted on the first three symbols of a slot) and ensure that the UE processes the PEI and the SSB within a centralized time.

For example, the PEI is transmitted before the associated SSB. For example, a sending occasion of the PEI starts from n slots before a starting position of the associated SSB (for example, a position of the SSB with a minimum index, where an index for actually sending the SSB is notified by a broadcast message/higher-layer signaling ssb-PositionsInBurst and does not necessarily start from 0), where $n \ge 1$. For example, a starting position or an ending position of the sending occasion of the PEI is the n slots before the starting position of the associated SSB, where $n \ge 1$. For example, the PEI is transmitted after the associated SSB. For example, the sending occasion of the PEI starts from the n-th slot after the starting position of the associated SSB (that is, a position of the SSB with a minimum index or a maximum index), where $n \ge 1$.

In an example, Case A is described below.

15 kHz SCS: an index of a symbol for sending the PEI in the half-frame includes at least one of a set $\{\{0, 1, 2, \ldots, 13\}/\{2, 8\}\}+14 \times n$. (The SSB is excluded.)

If the carrier frequency is less than or equal to 3 GHz, $n=0,1$.

If the carrier frequency is greater than 3 GHz and belongs to a frequency range 1 (FR1), $n=0, 1, 2, 3$.

$\{A\}/\{B\}$ represents a set difference between a set $\{A\}$ and a set $\{B\}$, that is, consists of elements belonging to the set $\{A\}$ but not belonging to the set $\{B\}$.

A symbol index 0 is an index of the first symbol in the half-frame, a symbol index 1 is an index of the second symbol in the half-frame, and so on.

Some symbol indexes may be selected as an embodiment. For example, for a PEI associated with an SSB with an index of i, an index of a symbol for sending the PEI in the half-frame includes at least one of a set $\{0, 1, 6, 7\}+14 \times n+i \times 6$, where $i=0$ or 1.

In an example, Case B is described below.

30 kHz SCS: the index of the symbol for sending the PEI in the half-frame includes at least one of a set $\{\{0, 1, 2, \ldots, 27\}/\{4, 8, 16, 20\}\}+28 \times n$. (The SSB is excluded.)

If the carrier frequency is less than or equal to 3 GHz, $n=0$. If the carrier frequency is greater than 3 GHz and belongs to the frequency range 1, $n=0,1$.

For example, for the PEI associated with the SSB with an index of i, the index of the symbol for sending the PEI in the half-frame includes at least one of a set $\{0, 1, 2, 3, 12, 13\}+14 \times n+i \times 6$, where i is an even number. For example, for a PEI associated with an SSB with an index of j, an index of a symbol for sending the PEI in the half-frame includes at least one of a set $\{2, 3, 12, 13, 14, 15\}+14 \times n+j \times 6$, where j is an odd number.

In an example, Case C is described below.

30 kHz SCS: The index of the symbol for sending the PEI in the half-frame includes at least one of a set $\{\{0, 1, 2, \ldots, 13\}/\{2, 8\}\}+14 \times n$. (The SSB $\{2, 8\}+14 \cdot n$ is excluded.)

If the carrier frequency is less than or equal to 3 GHz, $n=0,1$. If the carrier frequency is greater than 3 GHz and belongs to the frequency range 1, $n=0, 1, 2, 3$.

For unpaired frequency offsets, the carrier frequency is less than 1.88 GHz, and $n=0,1$ If the carrier frequency is greater than or equal to 1.88 GHz and belongs to the frequency range 1, $n=0, 1, 2, 3$.

For example, for the PEI associated with the SSB with an index of i, the index of the symbol for sending the PEI in the half-frame includes at least one of a set $\{0, 1, 6, 7\}+14 \times n+i \times 6$, where $i=0, 1, 2, 3$.

In an example, Case D is described below.

120 kHz SCS: the index of the symbol for sending the PEI in the half-frame includes at least one of a set $\{\{0, 1, 2, \ldots, 27\}/\{4, 8, 16, 20\}\}+28 \times n$. (The SSB $\{4, 8, 16, 20\}+28 \cdot n$ is excluded.) If the carrier frequency belongs to a frequency range 2 (FR2), $n=0, 1, 2, 3, 5, 6, 7, 8, 10, 11, 12, 13, 15, 16, 17, 18$.

For example, for the PEI associated with the SSB with an index of i, the index of the symbol for sending the PEI in the half-frame includes at least one of a set $\{0, 1, 2, 3, 12, 13\}+14 \times n+i \times 6$, where i is an even number. For example, for the PEI associated with the SSB with an index of j, the index of the symbol for sending the PEI in the half-frame includes at least one of a set $\{2, 3, 12, 13, 14, 15\}+14 \times n+j \times 6$, where j is an odd number.

In an example, Case E is described below.

240 kHz SCS: the index of the symbol for sending the PEI in the half-frame includes at least one of a set $\{\{0, 1, 2, \ldots, 55\}/\{8, 12, 16, 20, 32, 36, 40, 44\}\}+56 \times n$. If the carrier frequency belongs to the frequency range 2, $n=0, 1, 2, 3, 5, 6, 7, 8$.

For example, for the PEI associated with the SSB with an index of i, the index of the symbol for sending the PEI in the half-frame includes at least one of a set $\{0, 1, 12, 13\}+14 \times n+i+\mod (I, 4) \times 12$, where i is an integer.

In one embodiment, the frequency range 1 includes a frequency band below 6 GHz.

In one embodiment, the frequency range 2 includes a frequency band from 24 GHz to 52.6 GHz, or the frequency range 2 includes a frequency band from 24 GHz to 100 GHz.

For example, the position relationship between the PEI and the associated SSB is configurable. The distance between the PEI and the associated SSB is defined as PEI_SSB_offset. For example, PEI_SSB_offset is the distance between a starting position of the PEI and the starting position of the associated SSB. For example, PEI_SSB_offset is the distance between the starting position of the PEI and a positon of an SSB having the same beam direction as the PEI. For example, PEI_SSB_offset is the distance between the starting position of the PEI and a specified index position of the SSB (for example, an index of 1 of the SSB). For example, PEI_SSB_offset is the distance between an ending position of the PEI and the starting position of the associated SSB. For example, PEI_SSB_offset is the distance between the starting position of the PEI and an ending position of the associated SSB. For example, PEI_SSB_offset is the distance between the ending position of the PEI and the ending position of the associated SSB.

For example, an absolute value of PEI_SSB_offset is less than half the SSB period. When it is defined that the PEI is located before or after the associated SSB, the SSB refers to an SSB whose distance from the PEI is less than half the SSB period.

In an example, the value of PEI_SSB_offset is always greater than or equal to 0. A relative position between the PEI and the associated SSB is illustrated in a predefined manner. For example, the PEI is located before the associated SSB, the PEI is located after the SSB, or the time domain position of the PEI and a time domain position of the SSB overlap at a slot level. That is, the PEI and the SSB may be processed in the same slot but occupy different symbols; or the PEI and the SSB occupy the same symbol and different frequency resources.

An example in which PEI_SSB_offset represents the distance between the starting position of the PEI and the starting position of the SSB is used below.

Figure 6:
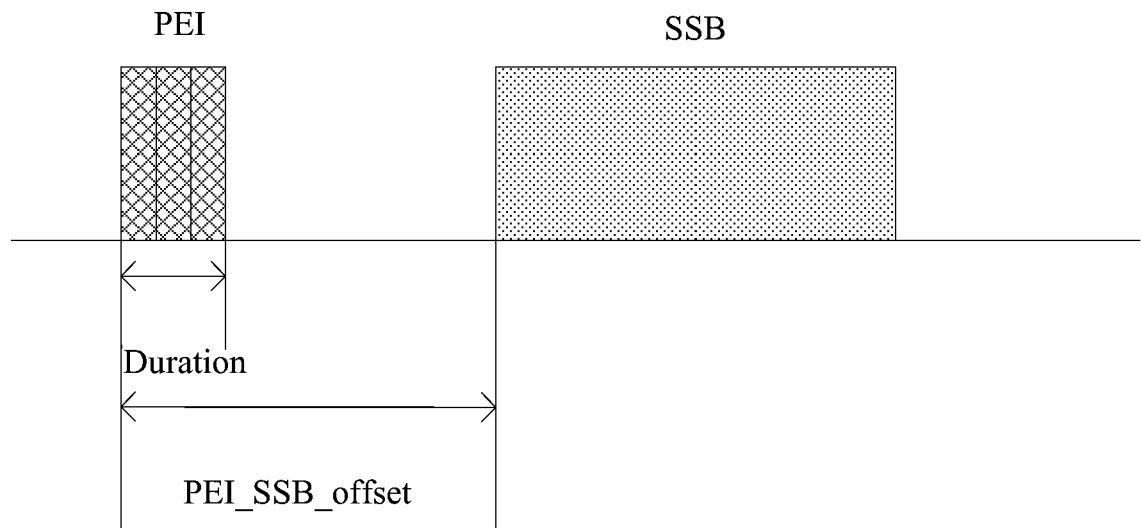
FIG. 6 is a schematic diagram of PEI_SSB_offset according to an embodiment of the present application.

As shown in FIG. 6, it is assumed that it is predefined that the PEI is located before the SSB, and the duration of the PEI is equal to three slots. When PEI_SSB_offset is just equal to three slots, the PEI is immediately next to the SSB. When PEI_SSB_offset is greater than three slots, the PEI is before the SSB but not immediately next to the SSB, and the UE has a period of time for a sleep after receiving the PEI and before receiving the SSB. When PEI_SSB_offset is less than three slots, the UE has both the PEI and the SSB on part of the slot. When PEI_SSB_offset is equal to 0, the starting position of the PEI and the starting position of the SSB overlap. In this case, if a processing time of the SSB is greater than three slots, all receiving opportunities of the PEI overlap with the SSB.

It is to be noted that the duration in the present application is the duration of the PEI. When the PEI is a PDCCH (DCI-based format), the duration may be a parameter in a search space set configuration. When the PEI is in the form of a sequence, the duration may be the number of slots for continuously sending the PEI.

If the PEI is before the SSB and PEI_SSB_offset is the distance between the ending position of the PEI and the starting position of the associated SSB, PEI_SSB_offset=0 indicates that the PEI is immediately adjacent to the SSB.

If the PEI is after the SSB, that a receiving time of the SSB is greater than PEI_SSB_offset indicates that the PEI and the SSB overlap in time domain.

For example, when it is predefined that the PEI is before or after the SSB, PEI_SSB_offset should satisfy the condition that the PEI and the SSB do not overlap in the time domain. That is, when the PEI is located before the SSB, all detection opportunities of the PEI are required to be before the SSB. For example, when the PEI is before the SSB, PEI_SSB_offset is the distance between the starting position of the PEI and the starting position of the SSB, and the duration of the PEI is three slots, PEI_SSB_offset is required to be greater than or equal to three slots.

For example, when the PEI and the SSB overlap in the time domain due to the duration of the PEI or the processing time of the SSB, the UE processes only a non-overlapping portion of the PEI. For example, when the PEI and the SSB overlap in the time domain due to the duration of the PEI or the processing time of the SSB but do not overlap in frequency domain, the UE detects both the PEI and the SSB in an overlapping time portion.

In an example, the value of PEI_SSB_offset may be positive, negative, or 0. The positive and negative values of PEI_SSB_offset are used for indicating the order of the PEI and the associated SSB. For example, the positive value of PEI_SSB_offset indicates that the PEI is before the SSB and the negative value of PEI_SSB_offset indicates that the PEI is after the SSB. Conversely, the positive value of PEI_SSB_offset indicates that the PEI is after the SSB and the negative value of PEI_SSB_offset indicates that the PEI is before the SSB.

For example, PEI_SSB_offset represents the distance between the starting position of the PEI and the starting position of the SSB. PEI_SSB_offset>0 indicates that the starting position of the PEI is before the starting position of the SSB; PEI_SSB_offset=0 indicates that the starting position of the PEI and the starting position of the SSB overlap; and PEI_SSB_offset<0 indicates that the starting position of the PEI is after the starting position of the SSB.

This embodiment is similar to the preceding embodiment. For example, when PEI_SSB_offset>0 or PEI_SSB_offset<0, PEI_SSB_offset should satisfy the condition that PEI and the SSB do not overlap in the time domain. For example, when PEI_SSB_offset represents the distance between the starting position of the PEI and the starting position of the SSB, in order that the PEI and the SSB do not overlap in the time domain, it is required that PEI_SSB_offset>the duration or PEI_SSB_offset→the processing time of the SSB. For example, PEI_SSB_offset is not limited. When the PEI and the SSB overlap in the time domain due to the duration of the PEI or the processing time of the SSB, the UE processes only the non-overlapping portion of the PEI. For example, when the PEI and the SSB overlap in the time domain due to the duration of the PEI or the processing time of the SSB, the UE detects both the PEI and the SSB in an overlapping portion.

For example, the position relationship between the PEI and the associated SSB is determined by the higher-layer signaling. For example, the order of the PEI and the associated SSB is determined by first higher-layer signaling; and an offset between the PEI and the associated SSB, that is, PEI_SSB_offset is determined by second higher-layer signaling. For example, if third higher-layer signaling is configured to be PEI_SSB_offset, it indicates that the PEI is before the associated SSB and the offset is PEI_SSB_offset; if fourth higher-layer signaling is configured to be PEI_SSB_offset, it indicates that the PEI is after the associated SSB and the offset is PEI_SSB_offset.

For example, the first higher-layer signaling depends on at least one of a UE capability, a UE type, a DRX parameter, a frequency range, or a spectrum type.

For example, the second higher-layer signaling depends on at least one of the UE capability, the UE type, the DRX parameter, the frequency range, or the spectrum type.

In one embodiment, where the UE detects the PEI signal, the number of PEI signals detected, and how to operate in case of missed detection are provided.

The base station periodically sends the PEI within the PEI sending window, and the UE may receive the PEI at a corresponding position. When multiple PEI sending opportunities exist within the PEI sending window, the UE does not need to detect every PEI. Moreover, the UE achieves different power saving gains when detecting the PEI at different PEI sending opportunities, and a good power saving gain cannot be always achieved when the PEI is detected at the first PEI detection opportunity within the PEI receiving window. To achieve an optimal power saving gain, it is necessary to define which PEI opportunity the UE detects the PEI at.

It is to be noted that the vicinity of the SSB in the present application may be before the SSB, in the SSB, or after the SSB.

In an example, the base station sends the PEI signal at all PEI positions within the PEI sending window, and the UE detects only a PEI signal associated with (or in the vicinity of) the first SSB actually processed by the UE within the PEI sending window. For example, if the PEI sending window includes three SSB processing opportunities and the UE processes the first SSB within the window, the UE detects the PEI at a PEI sending position in the vicinity of the first SSB and performs a corresponding operation as indicated by the PEI. If the UE does not process the SSB at the first SSB processing opportunity within the PEI sending window and the UE processes the second SSB, the UE does not detect the first PEI sending opportunity within the PEI sending window. The UE detects the PEI in the vicinity of the second SSB, that is, at the second PEI sending position, within the PEI sending window (as shown in FIGS. 3 and 4).

For example, the UE detects only one or more PEI signals having a predefined position relationship with the associated SSB within the PEI sending window. For example, the predefined position relationship is determined by the offset. For example, the offset is determined by at least one of the UE capability, the UE type, the frequency range, or a frequency offset type.

For example, if the UE successfully detects one PEI, the UE no longer detects a remaining PEI regardless of whether the UE processes a remaining SSB within the PEI sending window. For example, if the UE has not successfully detected the PEI at the first PEI detection position within the PEI sending window, the UE continues detecting the PEI at the next PEI position. For example, if the UE successfully detects one PEI, other PEIs within the current sending window are no longer detected. For example, only L PEIs are sent or configured within one sending window. L is a positive integer, for example, L=1. For example, only L PEIs are sent or configured within a period of a search space set for configuring PEIs.

For example, if the UE has no PEI sending opportunity in the vicinity of the first SSB processed within the PEI sending window, for example, the PEI before the SSB is just outside the PEI sending window, the UE detects the PEI at the next PEI sending opportunity.

For example, if no SSB within the PEI sending window is processed by the UE, for example, two SSB processing opportunities exist within the PEI sending window, but the UE processes only one SSB outside the PEI sending window, the UE detects the PEI at the first PEI sending position within the PEI sending window. For example, if no SSB within the PEI sending window is processed by the UE, the UE detects the PEI at the last PEI sending position within the PEI sending window. For example, if no SSB within the PEI sending window is processed by the UE, the UE does not detect the PEI in the paging cycle.

In an example, the UE always detects the PEI at the first PEI sending position within the PEI sending window. The PEI is detected at the first PEI sending position regardless of whether the UE processes an SSB in the vicinity of the first PEI sending position. For example, the UE needs to successfully detect only one PEI in the paging cycle. If the PEI is successfully detected, the UE no longer detects a subsequent PEI.

In an example, for example, the UE determines a position for detecting the PEI according to the number of SSBs processed before a PO in the last paging cycle. For example, if the UE processes only one SSB before the PO in the last paging cycle, the UE detects the PEI in the vicinity of an SSB closest to the PO in the next paging cycle. If three SSBs are processed before the PO in the last paging cycle, the PEI is detected in the vicinity of the third SSB before the PO in the next paging cycle, and if the detection fails, the PEI is detected again when/after the next SSB is processed.

For example, the length of the PEI sending window is made greater than the distance between the PO and the first SSB processed in the paging cycle. When the length of the PEI sending window is less than the distance between the PO and the first SSB processed in the paging cycle, the PEI is detected at the first PEI position within the PEI sending window.

In an example, the UE determines the position for detecting the PEI according to a measurement result in the last one or more paging cycles. For example, the UE determines the position of the PEI according to a measurement result (such as RSRP) in the last paging cycle. For example, the UE determines the position of the PEI according to an average of measurement results in the last M paging cycles. For example, an RSRP threshold is set, and the number of SSBs to be received is determined according to a range of an RSRP value in the last one or more paging cycles, and the position of the PEI is determined. For example, if the RSRP in the last one/multiple paging cycles>A, it indicates a relatively good channel condition, and it is considered that the UE needs to process only one SSB in the next paging cycle. The UE processes the SSB closest to the PO and detects the PEI in the vicinity of the SSB, that is, at a PEI position closest to the PO. When B<the RSRP in the last one/multiple paging cycles<A, it indicates that the current channel condition is fair, and the UE may need to process two SSBs before the PO. The UE processes two SSBs closer to the PO and detects the PEI in the vicinity of the processed first SSB in the paging cycle. When the RSRP in the last one/multiple paging cycles<B, it indicates that the current channel condition is relatively poor, and the UE needs to process three or more SSBs and detects the PEI in the vicinity of the first SSB processed within the window.

For example, if the UE is configured with a PEI time-frequency domain resource but detects no PEI or no detection opportunities exist in the paging cycle, the UE performs a predefined operation. For example, the predefined operation is that the UE receives paging DCI on the PO. The predefined operation is that the UE does not receive the paging DCI on the PO. For example, if the UE is configured with the PEI time-frequency domain resource but detects no PEI or no detection opportunities exist in the paging cycle, the UE omits PO reception in the paging cycle and performs a sleep operation by default. For example, if the UE is configured with the PEI time-frequency domain resource but detects no PEI or no detection opportunities exist in the paging cycle, whether the UE receives paging is indicated by a higher-layer parameter.

For example, no PEI detection opportunities include that at least one or all of the PEI detection opportunities collide or overlap with at least one of the following resources: an SSB resource; an SMTC window; a measurement gap; a positioning reference signal; a system message; a random access response window; CORESET 0; or a pre-configured time-frequency resource.

In one embodiment, to acquire the greater power saving gain, the UE should reduce power consumption for ramping up/down as much as possible to increase the time of the deep sleep. When the PEI is located around the SSB, the UE can obtain the greater power saving gain under the same channel condition. Therefore, when a PEI position is determined, reference to the SSB is an effective choice.

In the present application, the PEI position is determined by a two-stage indication method. The PEI is associated with the SSB so that the UE can acquire a highest power saving gain. A unique PEI position can reduce the power consumption of the base station for sending the PEI multiple times. A unique PEI sending position also enables the UE to accurately find a PEI detection opportunity, thereby acquiring the PEI signal and achieving a power saving effect.

In an implementation, a first-stage indication is provided, that is, the position of the PEI signal is determined by the SSB.

Figure 7:
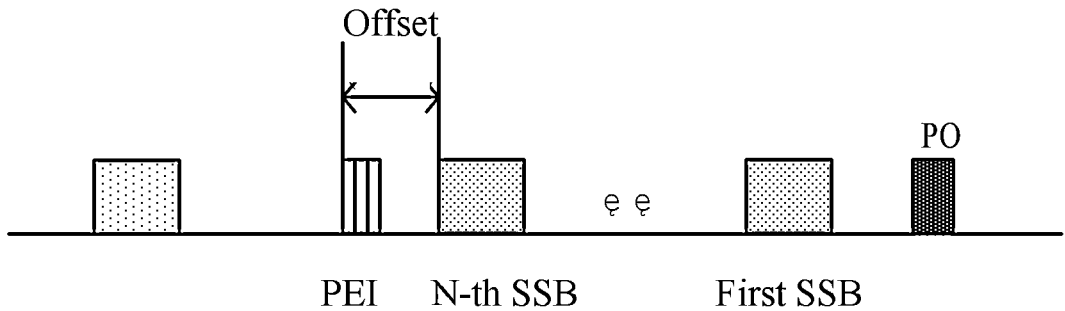
FIG. 7 is a schematic diagram of a position of a PEI and a position of the N-th synchronization signal block (SSB) according to an embodiment of the present application.
Figure 8:
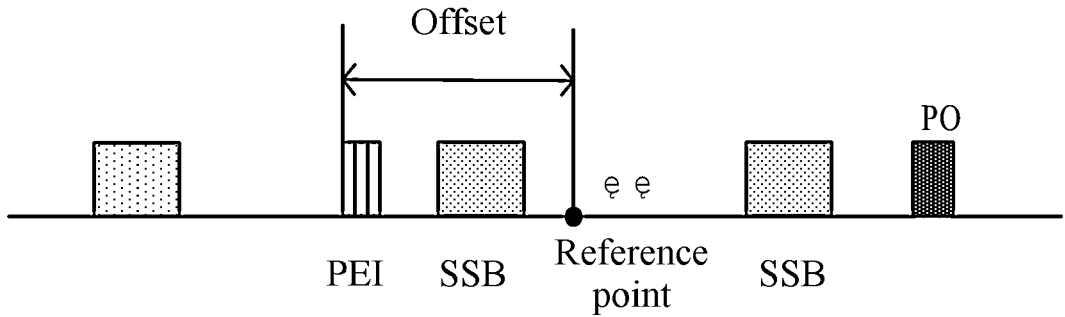
FIG. 8 is a schematic diagram of a position of a PEI and a position of a reference point according to an embodiment of the present application.

As shown in FIG. 7, the PEI position is associated with the N-th SSB before the PO, where N>0. For example, the N-th SSB refers to an SSB within the N-th SMTC window. For example, the N-th SSB refers to the N-th SSB burst. For example, the N-th SSB refers to an SSB with a certain SSB index in the N-th SSB burst, for example, the SSB index is equal to 0. For example, N ranges from 1 to 5, for example, N=1 or N=3. It is to be noted that an SSB burst closest to the PO is defined as the first SSB burst before the PO, and so on.

For example, N has a predefined fixed value. For example, N=1 or N=3.

For example, the value of N is configurable. For example, the value of N is determined by a higher-layer parameter. For example, if N=1 is configured by the higher-layer parameter, before the parameter changes, the PEI position is associated with the first SSB before the PO. When the environment of the UE changes, for example, after the UE moves from the center of a cell to the edge of the cell, the position for sending/receiving the PEI may be changed by a reconfiguration of the value of N. For example, N=3 is configured, the PEI position is associated with the third SSB before the PO, and the UE detects the PEI at the position associated with the third SSB before the PO.

For example, the value of N is indicated by other signaling, such as physical layer signaling. For example, the value of N in the next one/multiple paging cycles is carried and indicated by the PEI. Alternatively, the value of N is carried by paging DCI or other signaling.

For example, a value range of N is configured by higher-layer parameter, and a specific value of N is determined by the UE. For example, the value range of N is configured by the higher-layer parameter, and the specific value of N is related to the UE capability/UE type. The base station/network side determines the specific value of N according to the UE capability/UE type. For example, the value of N is 3 or 5 in a higher-layer configuration, N=3 is used by default for a UE with a high UE capability and N=5 is used by default for a UE with a low UE capability.

For example, the value of N is reported by the UE. For example, the UE determines the most appropriate value of N according to a previous measurement result, a channel condition, or the like and reports the most appropriate value of N to the base station/network side. For example, the base station/network side configures a default value that is known to the UE, and the default value is used when the UE does not report a value. After the UE reports a value, the value reported by the UE is used.

A second-stage indication is the position relationship between the PEI and the associated SSB.

After the value of N is determined, the position relationship between the PEI and the associated SSB is determined so that the accurate position for sending/receiving the PEI can be determined. The position relationship between the PEI and the N-th SSB associated with the PEI may be as described in Embodiment two. For example, the base station may transmit the PEI multiple times after determining the PEI position.

For example, if the UE is configured with the PEI time-frequency domain resource but detects no PEI or no detection opportunities exist in the paging cycle, the UE performs an operation before the introduction of the PEI (legacy UE and Rel-15/16 UE). The UE normally receives the paging DCI on the PO by default. For example, if the UE is configured with the PEI time-frequency domain resource but detects no PEI or no detection opportunities exist in the paging cycle, whether the UE normally receives paging is indicated by a higher-layer parameter.

In one embodiment, the PEI position is determined by the two-stage indication method in the present application. A reference point associated with the PEI position is determined firstly so that the UE can acquire a relatively high power saving gain and a more flexible configuration can be achieved.

The reference point is located before the PO. For example, a position of the reference point (that is, the position from the PO) is determined by a higher-layer parameter. For example, the position of the reference point is related to the SSB period. For example, the distance between the reference point and the PO is an integer multiple of the SSB period. For example, the distance between the reference point and the PO is an integer multiple of the SSB period plus an offset. For example, the reference point has a special characteristic. For example, for the reference point, SFN mod N=0, where N is a positive integer, for example, N=256.

For example, one reference point corresponds to one PEI position. For example, C reference points are associated with C PEI positions one to one, where $1 \leq C \leq 5$. For example, PEIs sent at the PEI positions associated with the C reference points have completely the same content. For example, the UE detects all the PEI positions. For example, the UE detects only one PEI in one paging cycle.

After the reference point is determined, the PEI position is determined by a position relationship between the PEI and the reference point. For example, the distance between the PEI and the reference point is denoted as PEI_Refer_offset. For example, PEI_Refer_offset is the distance from the starting position of the PEI to the reference point. For example, PEI_Refer_offset is the distance from the ending position of the PEI to the reference point. Similar to the position relationship between the PEI and the SSB described in other embodiments herein, PEI_Refer_offset may have different configurations, and the reference point may be before the PEI, overlap with the starting position of the PEI, or be after the PEI.

The description of the position relationship between the PEI and an adjacent SSB in the preceding embodiment is also applicable to the description of the position relationship between the PEI and the reference point. The value and configuration of PEI_SSB_offset are also applicable to PEI_Refer_offset.

The time domain position of the PEI is related to the reference point associated with the PEI. For example, the position relationship between the PEI and the associated reference point is fixed, for example, determined in a predefined manner or by higher-layer signaling or configured by a system message.

For example, the position relationship between the PEI and the associated reference point is related to at least one of the following factors: the carrier frequency, the subcarrier spacing, or the spectrum type. For example, the spectrum type includes the licensed spectrum or the unlicensed spectrum.

For example, the PEI and the associated reference point are transmitted in the same half-frame. For example, the PEI and the associated reference point occupy different symbols in the same half-frame.

For example, the PEI is transmitted before the associated reference point. For example, the sending occasion of the PEI starts from n slots before the associated reference point, where n≥1. For example, the starting position or the ending position of the sending occasion of the PEI is the n slots before the position of the associated reference point, where n≥1. For example, the PEI is transmitted after the associated reference point. For example, the sending occasion of the PEI starts from the n-th slot after the associated reference point, where n≥1.

For example, an absolute value of PEI_refer_offset is less than half the SSB period.

Case 1: For example, the value of PEI_refer_offset is always greater than or equal to 0. A relative position between the PEI and the associated reference point is illustrated in the predefined manner. For example, it is predefined that the PEI is before the associated reference point, and when PEI_refer_offset=5 slots, the PEI is located at a position 5 slots earlier than the reference point. In another example, it is predefined that the PEI is after the reference point, and when PEI_refer_offset=5 slots, the PEI is located at a position 5 slots later than the reference point. When PEI_refer_offset=0 slots, the PEI starts from the position of the reference point.

Case 2: For example, the value of PEI_refer_offset may be positive, negative, or 0. The positive and negative values of PEI_refer_offset are used for indicating the order of the PEI and the associated reference point. For example, PEI_refer_offset=0 indicates that the PEI position starts from the reference point. The positive value of PEI_refer_offset indicates that the PEI is before the reference point and the negative value of PEI_refer_offset indicates that the PEI is after the reference point. Conversely, the positive value of PEI_refer_offset indicates that the PEI is after the reference point and the negative value of PEI_refer_offset indicates that the PEI is before the reference point.

For example, the position relationship between the PEI and the associated reference point is determined by the higher-layer signaling. For example, the order of the PEI and the associated reference point is determined by first higher-layer signaling; and an offset between the PEI and the associated reference point, that is, PEI_refer_offset is determined by second higher-layer signaling. For example, if third higher-layer signaling is configured to be PEI_refer_offset, it indicates that the PEI is before the associated reference point and the offset is PEI_refer_offset; if fourth higher-layer signaling is configured to be PEI_refer_offset, it indicates that the PEI is after the associated reference point and the offset is PEI_refer_offset.

For example, when the reference point and PEI_SSB_offset are configured, it is necessary to satisfy that an SSB has an opportunity to appear between the starting position of the PEI and the reference point. For example, the SSB here refers to an SSB within an SSB receiving window. For example, the SSB here refers to the SSB burst. For example, the SSB here refers to an SSB having a particular index/beam direction. For example, one and only one SSB has an opportunity to appear between the starting position of the PEI and the reference point. For example, the value of PEI_SSB_offset is not greater than the SSB period. For example, an SSB has an opportunity to appear between the starting position of the PEI and the reference point, and the distance between the PEI and the SSB is less than a threshold such as s slots (where s is a positive integer such as 1 to 9) or ¼ of the SSB period. For example, no SSB has an opportunity to appear between the PEI and the reference point, and the distance between the PEI and a closest SSB is less than a threshold such as half the SSB period, ¼ of the SSB period, or the s slots.

For example, if the UE is configured with the PEI time-frequency domain resource but detects no PEI or no detection opportunities exist in the paging cycle, the UE performs an operation before the introduction of the PEI (legacy UE and Rel-15/Rel-16 UE). The UE normally receives the paging DCI on the PO by default. For example, if the UE is configured with the PEI time-frequency domain resource but detects no PEI or no detection opportunities exist in the paging cycle, whether the UE normally receives paging is indicated by a higher-layer parameter.

In one embodiment, the PEI in the present application may be in the form of DCI or a sequence.

For example, the PEI has periodicity in the time domain. For example, a period of the PEI is equal to the SSB period. For example, the period of the PEI is equal to N SSB periods.

For example, the PEI uses the same frequency domain resource as CORESET 0 in the frequency domain. For example, the PEI and the paging DCI use adjacent frequency domain resources in the frequency domain. For example, when the PEI is in the format of DCI, if the paging DCI is configured with CORESET 0, the PEI may be configured to be CORESET 0. For example, if the paging DCI is configured with CORESET 0, the PEI may be configured at a frequency domain position adjacent to CORESET 0, thereby ensuring that the UE does not need to switch between different frequency bands/frequencies and reducing additional power consumption.

In one embodiment, a solution to a possible resource collision of a first type of PEI is provided. For example, in this embodiment, the PEI is the first type of PEI. For example, the first type of PEI is a DCI-based PEI.

For example, when the PEI is configured with common search space (CSS) type-0, the UE does not expect to send the PEI at a RE position corresponding to the SSB. For example, when the PEI is not configured with CSS type-0 and overlaps with a RE of the SSB, the UE does not expect to monitor a PDCCH (detect the PEI) on an overlapping resource. For example, when the SSB and the PEI have the same QCL-type D, the SSB and the PEI are allowed to be received on the same symbol. For example, the UE does not expect to monitor the PDCCH (detect the PEI) on a resource configured with a CRS. For example, the UE does not expect to monitor the PDCCH (detect the PEI) on an unavailable resource.

For example, when a channel state information reference signal (CSI-RS) and the PEI have the same QCL-type D, the CSI-RS and the PEI are allowed to be received on different subcarriers of the same symbol. For example, when the PEI conflicts with a PDCCH configured with a Type1-PDCCH CSS set and the PEI and the PDCCH configured with the Type1-PDCCH CSS set do not have the same QCL-type D, the UE does not monitor the PEI.

For example, when a resource overlap occurs between the PEI and a PDSCH, a priority of the PEI and a priority of the PDSCH depend on a type of information carried by the PDSCH and a type of an RNTI that scrambles a PDCCH for scheduling the PDSCH. For example, when the PDSCH is scheduled by a PDCCH scrambled by a C-RNTI, a CS-RNTI, or an MCS-C-RNTI, the PEI is preferentially mapped. When the PDSCH is scheduled by a PDCCH scrambled by an RA-RNTI, an MsgB-RNTI, a P-RNTI, an SI-RNTI, or a TC-RNTI, the PDSCH is preferentially mapped. When the PDSCH is a system message, the PDSCH is preferentially mapped.

For example, when a resource collision occurs between the PEI and a random access response (RAR) window, priorities are determined according to a reason for triggering the RAR window. For example, when an RAR is triggered by an initial access, the RAR has a high priority and is preferentially processed. When the RAR is triggered by a beam failure/radio link monitoring failure, the PEI has a high priority and is preferentially processed.

For example, when a resource collision occurs between the PEI and another signaling/signal, information carried by a resource is transparent to a UE in a connected state, that is, the base station configures a first resource to notify the UE in the connected state of whether the information carried by the resource is the PEI or another signal/channel.

For example, when a data transmission resource overlaps with the first resource, whether to receive data is determined according to a priority of the data transmission resource and a priority of the first resource. For example, the first resource is related to the PEI.

The priority of the data transmission resource and the priority of the first resource include one or more of the cases below.

When the data transmission resource is a PDSCH data transmission resource, the priority of the data transmission resource and the priority of the first resource are determined by at least one of a type of information carried by a PDSCH, a type of an RNTI that scrambles a PDCCH for scheduling the PDSCH, or a trigger manner.

When the data transmission resource is a random access response window, the priority of the data transmission resource and the priority of the first resource are determined by a reason for triggering the random access response window.

When the data transmission resource is a PDCCH data transmission resource, the priority of the data transmission resource and the priority of the first resource are determined by at least one of a type of information carried by a PDCCH, a format of control information carried by the PDCCH, a type of an RNTI that scrambles the PDCCH, a control resource set related to the PDCCH, or a type of a search space related to the PDCCH.

When the data transmission resource is a reference signal time-frequency resource, the priority of the data transmission resource and the priority of the first resource are determined by at least one of a type of a reference signal, a temporal characteristic of the reference signal, or a trigger manner of the reference signal.

When the data transmission resource is an SSB time-frequency resource, the priority of the data transmission resource and the priority of the first resource are determined by a PEI-related time-frequency resource.

For example, when a resource overlap occurs between the first resource and the PDSCH, the priority of the first resource and the priority of the PDSCH depend on the type of the information carried by the PDSCH and the type of the RNTI that scrambles the PDCCH for scheduling the PDSCH. For example, when the PDSCH is scheduled by the PDCCH scrambled by the C-RNTI, the CS-RNTI, or the MCS-C-RNTI, the PEI is preferentially mapped. When the PDSCH is scheduled by the PDCCH scrambled by the RA-RNTI, the MsgB-RNTI, the P-RNTI, the SI-RNTI, or the TC-RNTI, the PDSCH is preferentially mapped. When the PDSCH is the system message, the PDSCH is preferentially mapped.

For example, when a resource overlap occurs between the first resource and the reference signal, the priority of the first resource and the priority of the reference signal depend on and are determined by at least one of the type of the reference signal, the temporal characteristic of the reference signal, or the trigger manner of the reference signal. For example, when the reference signal is the SSB or the positioning reference signal, the SSB or the positioning reference signal is preferentially mapped. For example, when the reference signal is the CSI-RS and the temporal characteristic of the CSI-RS is periodic, the periodic CSI-RS is not received. For example, when the reference signal is the CSI-RS and the temporal characteristic of the CSI-RS is being triggered by DCI, the CSI-RS is received.

For example, when a resource collision occurs between the first resource and the RAR window, the priorities are determined according to the reason for triggering the RAR window. For example, when the RAR is triggered by the initial access, the RAR has a high priority and is preferentially processed. When the RAR is triggered by the beam failure/radio link monitoring failure, the RAR has a low priority.

For example, when a resource overlap/collision occurs between the PEI and another signaling/signal (including, but not limited to, the SSB, the CSI-RS, an unavailable resource block (RB) (NR-U), a measurement gap, a certain type of PDSCH, the RAR window), which results in a monitoring failure, the UE monitors the PO. For example, when the resource overlap/collision occurs between the PEI and another signaling/signal, which results in the monitoring failure, the UE does not monitor the PEI, and whether to monitor the PO is configured by a higher layer. When the resource overlap/collision occurs between the PEI and another signaling/signal, which results in the monitoring failure, the UE does not monitor the PO.

For example, when the UE configures an opportunity of monitoring the PEI but detects no PEI, the UE monitors the PO. For example, when the UE configures the opportunity of monitoring the PEI but detects no PEI, the UE does not monitor the PO by default. For example, when the UE detects no PEI, whether the UE monitors the PO is determined by a higher-layer configuration/signaling.

In one embodiment, a solution to a possible resource collision of a second type of PEI is provided. For example, in this embodiment, the PEI is the second type of PEI. For example, the second type of PEI is a sequence-based PEI.

For example, when the PEI and the SSB have the same QCL-type D, the PEI and the SSB are allowed to be configured on different subcarriers of the same symbol; otherwise, the UE does not expect to configure the PEI and the SSB on the same symbol. For example, the UE does not expect the PEI and the CRS to be on the same symbol. When the PEI and the CRS are on the same symbol, the UE does not detect the PEI. For example, the UE does not expect to detect the PEI on the unavailable resource. For example, when the PEI and the CSI-RS, DMRS, or PRS have the same QCL-type D, the PEI and the CSI-RS, DMRS, or PRS are allowed to be on the same symbol; otherwise, the UE does not expect the PEI and the CSI-RS, DMRS, or PRS to be on the same symbol.

For example, the UE does not expect to monitor the PEI if a resource overlap/collision occurs between the PEI and a PDCCH configured with a Type0/0A/1/2-PDCCH CSS set. For example, the UE does not expect to monitor a Type3-PDCCH CSS or a UE-specific search space if a resource overlap/collision occurs between the PEI and a PDCCH configured with the Type3-PDCCH CSS or the UE-specific search space.

For example, when a resource overlap occurs between the PEI and the PDSCH, the priority of the PEI and the priority of the PDSCH depend on the type of the information carried by the PDSCH and the type of the RNTI that scrambles the PDCCH for scheduling the PDSCH. For example, when the PDSCH is scheduled by the PDCCH scrambled by the C-RNTI, the CS-RNTI, or the MCS-C-RNTI, the PEI is preferentially mapped. When the PDSCH is scheduled by the PDCCH scrambled by the RA-RNTI, the MsgB-RNTI, the P-RNTI, or the TC-RNTI, the PDSCH is preferentially mapped. When the PDSCH is the system message, the PDSCH is preferentially mapped.

For example, when a resource collision occurs between the PEI and the RAR window, the priorities are determined according to the reason for triggering the RAR window. For example, when the RAR is triggered by the initial access, the RAR has a high priority and is preferentially processed. When the RAR is triggered by the beam failure/radio link monitoring failure, the PEI has a high priority and is preferentially processed.

For example, when a resource collision occurs between the PEI and another signaling/signal, the information carried by the resource is transparent to the UE in the connected state, that is, the base station notifies the UE in the connected state of whether the information carried by the resource is the PEI or another signal/channel.

For example, when a resource overlap/collision occurs between the PEI and another signaling/signal (including, but not limited to, the SSB, the CRS, the unavailable RB (NR-U), the measurement gap, a certain type of PDSCH, the RAR window), which results in the monitoring failure, the UE performs a legacy operation and monitors the PO by default. For example, when the resource overlap/collision occurs between the PEI and another signaling/signal, which results in the monitoring failure, whether the UE monitors the PO is configured by the higher layer.

For example, when the UE configures the opportunity of monitoring the PEI but detects no PEI, the UE performs the legacy operation by default and monitors the PO by default. For example, when the UE configures the opportunity of monitoring the PEI but detects no PEI, the UE does not monitor the PO by default. For example, when the UE detects no PEI, whether the UE monitors the PO is determined by the higher-layer configuration/signaling.

Figure 9:
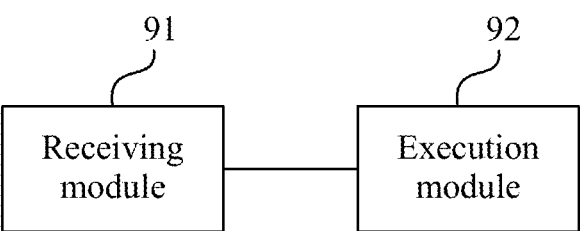
FIG. 9 is a schematic diagram of a signal receiving apparatus according to an embodiment of the present application.

One embodiment provides a signal receiving apparatus configured in a UE. The signal receiving apparatus is applicable to the case where multiple PEI time domain positions are determined. As shown in FIG. 9, the signal receiving apparatus provided by the embodiment of the present application mainly includes a receiving module 91 and an execution module 92.

The receiving module 91 is configured to receive a PEI signal before a PO, where the PEI signal is used for indicating whether the UE receives the PO in a paging cycle.

The execution module 92 is configured to perform a predefined operation based on the PEI signal.

In an embodiment, the predefined operation includes one or more of the operations below.

The PO is received.

The PO is not received.

Paging DCI is received.

In an embodiment, that the PEI signal is received before the PO includes that the PEI signal is received at a PEI time-frequency resource position within a PEI receiving window.

In an embodiment, the PEI signal further includes one or more of the following information: an indication of a reference signal resource or a reference signal resource set; whether to receive a broadcast/multicast message; or an indication of a system message update.

In an embodiment, information about the PEI receiving window is configured by a base station according to one or more of the following information: a UE capability, a UE type, or DRX configuration information.

The information about the PEI receiving window includes one or more of a starting position of the PEI receiving window, an ending position of the PEI receiving window, or a duration of the PEI receiving window.

In an embodiment, the ending position of the PEI receiving window is a starting position of the PO; or the ending position of the PEI receiving window is before a starting position of the PO.

In an embodiment, the duration of the PEI receiving window is associated with an SSB period: the duration of the PEI receiving window is equal to N SSB periods plus an offset, where N≥0, and the offset is greater than or equal to 0.

In an embodiment, a time domain position of the PEI signal is determined by an SSB associated with the PEI signal.

In an embodiment, that the PEI signal is received at the PEI time-frequency resource position within the PEI receiving window includes one or more of the following.

The PEI signal is received at the first PEI receiving position within the PEI receiving window.

The PEI signal is received at a first preset position within the PEI receiving window, where the first preset position is related to an SSB associated with the PEI.

The PEI signal is received at a second preset position within the PEI receiving window, where the second preset position is determined based on the number of SSBs processed before a PO in the last paging cycle.

The PEI signal is received at a third preset position within the PEI receiving window, where the third preset position is determined based on a measurement result in the last one or more paging cycles.

In an embodiment, the time domain position of the PEI signal is associated with the N-th SSB before the PO, where N is a positive integer.

In an embodiment, the SSB associated with the PEI signal satisfies one or more of the conditions below.

The associated SSB has a shortest distance from the PEI signal.

The associated SSB and the PEI signal have a quasi co-location relationship.

The associated SSB and the PEI signal have the same beam direction or the same quasi co-location type.

The associated SSB and the PEI signal have the same index.

An index of the associated SSB and an index of the PEI signal are arranged at the same position.

The associated SSB is configured by higher-layer signaling or a system message.

The associated SSB is determined in a predefined manner.

In an embodiment, a position relationship between the PEI signal and the SSB associated with the PEI signal is determined by one or more of the following parameters: a carrier frequency, a subcarrier spacing, an SSB pattern, an SSB period, an SSB index, a multiplexing pattern between an SSB and a CORESET, or a spectrum type.

In an embodiment, a transmission position of the PEI signal and a transmission position of the SSB associated with the PEI signal include one or more of the following.

The PEI signal and the SSB associated with the PEI signal are transmitted in the same slot.

The transmission position of the PEI signal is before the transmission position of the SSB associated with the PEI signal.

The transmission position of the PEI signal is after the transmission position of the SSB associated with the PEI signal.

The PEI signal and the SSB associated with the PEI signal are transmitted in the same half-frame.

In an embodiment, the distance between the PEI signal and the SSB associated with the PEI signal includes one or more of the following: the distance between a starting position of the PEI signal and a starting position of the SSB associated with the PEI; the distance between a starting position of the PEI signal and a position of an SSB having the same beam direction as the PEI; or the distance between a starting position of the PEI signal and a specified index position of the SSB associated with the PEI.

In an embodiment, the distance between the PEI signal and the SSB associated with the PEI signal is determined by a first parameter, where the first parameter includes one or more of the following.

The first parameter is a number greater than or equal to 0.

The first parameter is any natural number.

The first parameter is determined in a predefined manner.

The first parameter is determined by a higher-layer parameter.

The first parameter is determined by the UE capability.

The first parameter is determined by a DRX parameter.

In an embodiment, N is determined within a specified range, where the specified range is configured by a higher-layer parameter, determined by a predefinition, or indicated by DCI.

In an embodiment, N is determined within the specified range based on one or more of the following parameters: a channel measurement result or a channel condition.

In an embodiment, the N-th SSB before the PO, which is associated with the PEI, includes one or more of: an SSB in the N-th SMTC window; the N-th SSB burst; or an SSB with an SSB index in the N-th SSB burst.

In an embodiment, the time domain position of the PEI signal is related to a pre-configured reference point before the PO.

In an embodiment, the reference point includes the following.

The reference point is determined by a higher-layer parameter.

The distance between the reference point and the PO is an integer number of SSB periods plus an offset.

The reference point satisfies that SFN mod M=0, where M is a positive integer.

In an embodiment, the time domain position of the PEI signal is determined based on the distance between the PEI signal and the reference point.

In an embodiment, a relationship between the PEI signal and the reference point includes at least one of the following.

An SSB exists between the starting position of the PEI signal and the reference point.

An SSB exists between an ending position of the PEI signal and the reference point.

An SSB exists between the PO and the reference point.

In an embodiment, the distance between the PEI signal and the reference point is determined by a second parameter, where the second parameter includes one or more of the following.

The second parameter is a number greater than or equal to 0.

The second parameter is any natural number.

The second parameter is determined in a predefined manner.

The second parameter is determined by a higher-layer parameter.

The second parameter is determined by a DRX parameter.

In an embodiment, the method further includes the following.

When the PEI signal is not detected on a PEI time-frequency domain resource or no detection opportunities exist in the paging cycle, the UE receives the PO.

Alternatively, when the PEI signal is not detected on a PEI time-frequency domain resource or no detection opportunities exist in the paging cycle, the UE does not receive the PO.

Alternatively, when the PEI signal is not detected on a PEI time-frequency domain resource or no detection opportunities exist in the paging cycle, whether the UE receives the PO is determined by a higher-layer parameter.

In an embodiment, no PEI detection opportunities include that at least one or all of the PEI detection opportunities collide or overlap with at least one of the following resources: an SSB resource; an SMTC window; a measurement gap; a positioning reference signal; a system message; a random access response window; CORESET 0; or a pre-configured time-frequency resource.

In an embodiment, the method further includes the following.

In the case where a resource overlap occurs between a PEI time-frequency resource and a non-PEI time-frequency resource, a predefined operation is performed based on a resource overlap situation.

In an embodiment, that the predefined operation is performed based on the resource overlap situation includes the following.

A signal with a high priority is received according to predefined priorities, where the predefined priorities include one or more of the cases below.

When the PEI time-frequency resource overlaps with a PDSCH time-frequency resource, a priority of the PEI signal and a priority of a PDSCH are determined by a type of information carried by the PDSCH and a type of an RNTI that scrambles a PDCCH for scheduling the PDSCH.

When a resource overlap occurs between the PEI time-frequency resource and a random access response window, a priority of the PEI signal and a priority of an access response are determined by a reason for triggering the random access response window.

In an embodiment, in the case where the PEI signal is indicated by DCI, that a corresponding operation is performed based on the resource overlap situation includes one or more of the following.

When a resource overlap occurs between the PEI and another signaling and/or signal, the PO is monitored.

When a resource overlap occurs between the PEI and another signaling and/or signal, whether to monitor the PO is determined based on a higher-layer configuration.

The signal receiving apparatus provided in this embodiment may perform the signal receiving method according to any embodiment of the present disclosure and has function modules and beneficial effects corresponding to the performed method. For technical details not described in detail in this embodiment, reference may be made to the signal receiving method according to any embodiment of the present disclosure.

It is to be noted that units and modules included in the embodiment of the signal receiving apparatus are just divided according to functional logic, and the division is not limited to this as long as the corresponding functions can be implemented. Additionally, the specific names of function units are just intended for distinguishing and are not intended to limit the scope of the present application.

Figure 10:
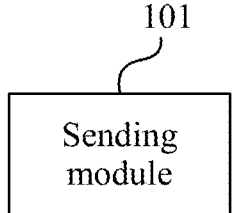
FIG. 10 is a schematic diagram of a signal sending apparatus according to an embodiment of the present application.

One embodiment provides a signal sending apparatus configured in a base station. The signal sending apparatus is applicable to the case where multiple PEI time domain positions are determined. As shown in FIG. 10, the signal sending apparatus provided by the embodiment of the present application mainly includes a sending module 101.

The sending module is configured to send a PEI signal before a PO, where the PEI signal is used for instructing a UE to perform a predefined operation based on the PEI signal.

In an embodiment, the predefined operation includes one or more of the operations below.

The PO is received.

The PO is not received.

Paging DCI is received.

In an embodiment, that the PEI signal is sent before the PO includes that the PEI signal is sent at a PEI time-frequency resource position within a PEI sending window.

In an embodiment, the PEI signal further includes one or more of the following information: an indication of a reference signal resource or a reference signal resource set; whether to receive a broadcast/multicast message; or an indication of a system message update.

In an embodiment, that the PEI signal is sent at the PEI time-frequency resource position within the PEI sending window includes the following.

The PEI signal is sent at a preset period at the PEI time-frequency resource position within the PEI sending window.

In an embodiment, the preset period is a multiple of an SSB period.

In an embodiment, that the PEI signal is sent before the PO includes that the PEI is sent at a PEI position associated with the N-th SSB before the PO.

In an embodiment, information about the PEI sending window is configured by the base station according to one or more of the following information: a UE capability, a UE type, or DRX configuration information.

The information about the PEI sending window includes one or more of a starting position of the PEI sending window, an ending position of the PEI sending window, or a duration of the PEI sending window.

In an embodiment, the ending position of the PEI sending window is a starting position of the PO; or the ending position of the PEI sending window is before a starting position of the PO.

In an embodiment, the duration of the PEI sending window is associated with the SSB period: the duration of the PEI sending window is equal to N SSB periods plus an offset, where $N \geq 0$, and the offset is greater than or equal to 0.

In an embodiment, a time domain position of the PEI signal is determined by an SSB associated with the PEI signal.

In an embodiment, that the PEI signal is received at the PEI time-frequency resource position within the PEI sending window includes one or more of the following.

The PEI signal is received at the first PEI receiving position within the PEI sending window.

The PEI signal is received at a first preset position within the PEI sending window, where the first preset position is related to an SSB associated with the PEI.

The PEI signal is received at a second preset position within the PEI sending window, where the second preset position is determined based on the number of SSBs processed before a PO in the last paging cycle.

The PEI signal is received at a third preset position within the PEI sending window, where the third preset position is determined based on a measurement result in the last one or more paging cycles.

In an embodiment, the time domain position of the PEI signal is associated with the N-th SSB before the PO, where N is a positive integer.

In an embodiment, the SSB associated with the PEI signal satisfies one or more of the conditions below.

The associated SSB has a shortest distance from the PEI signal.

The associated SSB and the PEI signal have a quasi co-location relationship.

The associated SSB and the PEI signal have the same beam direction or the same quasi co-location type.

The associated SSB and the PEI signal have the same index.

An index of the associated SSB and an index of the PEI signal are arranged at the same position.

The associated SSB is configured by higher-layer signaling or a system message.

The associated SSB is determined in a predefined manner.

In an embodiment, a position relationship between the PEI signal and the SSB associated with the PEI signal is determined by one or more of the following parameters: a carrier frequency, a subcarrier spacing, an SSB pattern, an SSB period, an SSB index, a multiplexing pattern between an SSB and a CORESET, or a spectrum type.

In an embodiment, a transmission position of the PEI signal and a transmission position of the SSB associated with the PEI signal include one or more of the following.

The PEI signal and the SSB associated with the PEI signal are transmitted in the same slot.

The transmission position of the PEI signal is before the transmission position of the SSB associated with the PEI signal.

The transmission position of the PEI signal is after the transmission position of the SSB associated with the PEI signal.

The PEI signal and the SSB associated with the PEI signal are transmitted in the same half-frame.

In an embodiment, the distance between the PEI signal and the SSB associated with the PEI signal includes one or more of the following: the distance between a starting position of the PEI signal and a starting position of the SSB associated with the PEI; the distance between a starting position of the PEI signal and a position of an SSB having the same beam direction as the PEI; or the distance between a starting position of the PEI signal and a specified index position of the SSB associated with the PEI.

In an embodiment, the distance between the PEI signal and the SSB associated with the PEI signal is determined by a first parameter, where the first parameter includes one or more of the following.

The first parameter is a number greater than or equal to 0.

The first parameter is any natural number.

The first parameter is determined in a predefined manner.

The first parameter is determined by a higher-layer parameter.

The first parameter is determined by the UE capability.

The first parameter is determined by a DRX parameter.

In an embodiment, N is determined within a specified range, where the specified range is configured by a higher-layer parameter, determined by a predefinition, or indicated by DCI.

In an embodiment, N is determined within the specified range based on one or more of the following parameters: a channel measurement result or a channel condition.

In an embodiment, the N-th SSB before the PO, which is associated with the PEI, includes one or more of: an SSB in the N-th SMTC window; the N-th SSB burst; or an SSB with an SSB index in the N-th SSB burst.

In an embodiment, that the PEI signal is sent before the PO includes that the PEI is sent at a PEI position associated with a reference point before the PO.

In an embodiment, the reference point includes the following.

The reference point is determined by a higher-layer parameter.

The distance between the reference point and the PO is an integer number of SSB periods plus an offset.

The reference point satisfies that SFN mod M=0, where M is a positive integer.

In an embodiment, the time domain position of the PEI signal is determined based on the distance between the PEI signal and the reference point.

In an embodiment, a relationship between the PEI signal and the reference point includes at least one of the following.

An SSB exists between the starting position of the PEI signal and the reference point.

An SSB exists between an ending position of the PEI signal and the reference point.

An SSB exists between the PO and the reference point.

In an embodiment, the distance between the PEI signal and the reference point is determined by a second parameter, where the second parameter includes one or more of the following.

The second parameter is a number greater than or equal to 0.

The second parameter is any natural number.

The second parameter is determined in a predefined manner.

The second parameter is determined by a higher-layer parameter.

The second parameter is determined by the UE capability.

The second parameter is determined by a DRX parameter.

In an embodiment, information indicated by the PEI includes at least one of the following: whether to receive m POs; whether to receive the paging DCI; whether to receive a paging PDSCH or a paging message; whether to receive the broadcast/multicast message; the indication of the reference signal resource or the reference signal resource set; or the indication of the system message update.

The indication of the reference signal resource or the reference signal resource set includes one of the following: whether the reference signal resource or the reference signal resource set exists; whether the UE needs to perform blind detection on the reference signal resource or the reference signal resource set; or whether the reference signal resource or the reference signal resource set is updated or activated or deactivated.

The signal sending apparatus provided in this embodiment may perform the signal sending method according to any embodiment of the present disclosure and has function modules and beneficial effects corresponding to the performed method. For technical details not described in detail in this embodiment, reference may be made to the signal sending method according to any embodiment of the present disclosure.

It is to be noted that units and modules included in the embodiment of the signal sending apparatus are just divided according to functional logic, and the division is not limited to this as long as the corresponding functions can be implemented. Additionally, the specific names of function units are just intended for distinguishing and are not intended to limit the scope of the present application.

One embodiment provides a signal receiving apparatus configured in a UE. The signal receiving apparatus is applicable to the case where how to process a resource collision or overlap is determined. The signal receiving apparatus provided by the embodiment of the present application mainly includes a second receiving module and a determination module. The UE works in a connected state.

The second receiving module is configured to receive an indication of a data transmission resource and an indication of a first resource, where the data transmission resource includes a PDSCH and a PDCCH.

The determination module is configured to, when the data transmission resource overlaps with the first resource, determine, according to a priority of the data transmission resource and a priority of the first resource, whether to receive data.

In an embodiment, the first resource is related to a PEI signal.

In an embodiment, the priority of the data transmission resource and the priority of the first resource include one or more of the cases below.

When the data transmission resource is a PDSCH data transmission resource, the priority of the data transmission resource and the priority of the first resource are determined by at least one of a type of information carried by the PDSCH, a type of an RNTI that scrambles a PDCCH for scheduling the PDSCH, or a trigger manner.

When the data transmission resource is a random access response window, the priority of the data transmission resource and the priority of the first resource are determined by a reason for triggering the random access response window.

When the data transmission resource is a PDCCH data transmission resource, the priority of the data transmission resource and the priority of the first resource are determined by at least one of a type of information carried by the PDCCH, a format of control information carried by the PDCCH, a type of an RNTI that scrambles the PDCCH, a control resource set related to the PDCCH, or a type of a search space related to the PDCCH.

When the data transmission resource is a reference signal time-frequency resource, the priority of the data transmission resource and the priority of the first resource are determined by at least one of a type of a reference signal, a temporal characteristic of the reference signal, or a trigger manner of the reference signal.

When the data transmission resource is an SSB time-frequency resource, the priority of the data transmission resource and the priority of the first resource are determined by a PEI-related time-frequency resource.

Figure 11:
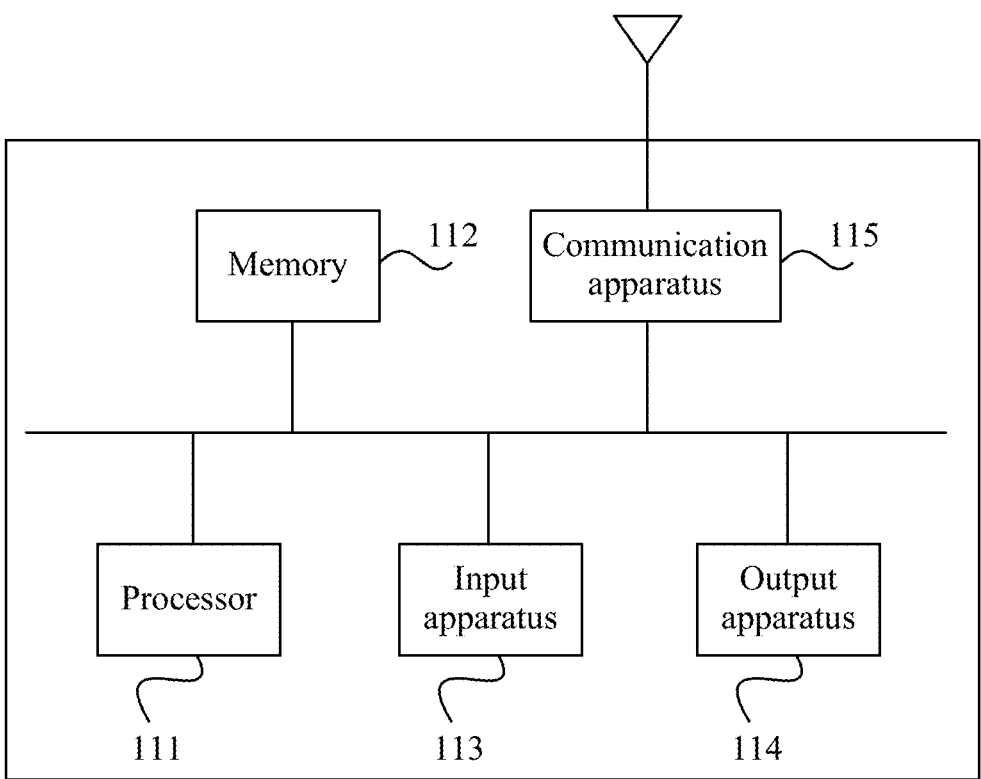
FIG. 11 is a structure diagram of a device according to an embodiment of the present application.

An embodiment of the present application further provides a device. FIG. 11 is a structure diagram of a device according to an embodiment of the present application. As shown in FIG. 11, the device includes a processor 111, a memory 112, an input apparatus 113, an output apparatus 114, and a communication apparatus 115. One or more processors 111 may be provided in the device. One processor 111 is used as an example in FIG. 11. The processor 111, the memory 112, the input apparatus 113, and the output apparatus 114 in the device may be connected through a bus or in other manners. In FIG. 11, the connection through a bus is shown as an example.

As a computer-readable storage medium, the memory 112 may be configured to store software programs, computer-executable programs, and modules, such as program instructions/modules corresponding to the methods in the embodiments of the present application. The processor 111 executes software programs, instructions, and modules stored in the memory 112 to perform various function applications and data processing of the device, that is, to implement any method according to an embodiment of the present application.

The memory 112 may mainly include a program storage region and a data storage region, where the program storage region may store an operating system and an application program required by at least one function, and the data storage region may store data created according to the use of the device. Additionally, the memory 112 may include a high-speed random-access memory and may also include a nonvolatile memory, such as at least one disk memory, flash memory, or other nonvolatile solid-state memory. In some examples, the memory 112 may include memories which are remotely disposed relative to the processor 111, and these remote memories may be connected to the device via a network. Examples of the preceding network include, but are not limited to, the Internet, an intranet, a local area network, a mobile communication network, and a combination thereof.

The input apparatus 113 may be configured to receive inputted digital or character information and generate key signal input related to user settings and function control of the device. The output apparatus 114 may include a display device such as a display screen.

The communication apparatus 115 may include a receiver and a sender. The communication apparatus 115 is configured to perform information transceiving communication under the control of the processor 111.

In an example embodiment, an embodiment of the present application further provides a non-transitory computer readable storage medium including computer-executable instructions, where the computer-executable instructions are used for performing a signal receiving method when executed by a computer processor. The method is applied by a UE and includes the following.

A PEI signal is received before a PO, where the PEI signal is used for indicating whether the UE receives the PO in a paging cycle.

A predefined operation is performed based on the PEI signal.

Of course, in the storage medium including the computer-executable instructions, which is provided by the embodiment of the present application, the computer-executable instructions may implement not only operations in the preceding method but also related operations in the signal receiving method according to any embodiment of the present application.

In an example embodiment, an embodiment of the present application further provides a storage medium including computer-executable instructions, where the computer-executable instructions are used for performing a signal sending method when executed by a computer processor. The method is applied by a base station and includes the following.

A PEI signal is sent before a PO, where the PEI signal is used for instructing a UE to perform a predefined operation based on the PEI signal.

Of course, in the storage medium including the computer-executable instructions, which is provided by the embodiment of the present application, the computer-executable instructions may implement not only operations in the preceding method but also related operations in the signal sending method according to any embodiment of the present application.

In an example embodiment, an embodiment of the present application further provides a storage medium including computer-executable instructions, where the computer-executable instructions are used for performing a signal receiving method when executed by a computer processor. The method is applied by a UE and includes the following.

An indication of a data transmission resource is received, where the data transmission resource includes a PDSCH and a PDCCH.

An indication of a first resource is received.

When the data transmission resource overlaps with the first resource, whether to receive data is determined according to a priority of the data transmission resource and a priority of the first resource.

Of course, in the storage medium including the computer-executable instructions, which is provided by the embodiment of the present application, the computer-executable instructions may implement not only operations in the preceding method but also related operations in the signal receiving method according to any embodiment of the present application.

From the preceding description of embodiments, it is apparent to those skilled in the art that the present application may be implemented by use of software and necessary general-purpose hardware or may be implemented by hardware. Based on this understanding, the technical solutions of the present application substantially, or the part contributing to the related art, may be embodied in the form of a software product. The computer software product may be stored in a computer-readable storage medium such as a floppy disk, a read-only memory (ROM), a random-access memory (RAM), a flash memory, a hard disk, or an optical disk of a computer and includes several instructions for causing a computer device (which may be a personal computer, a server, or a network device) to perform the method in the embodiments of the present application.

The preceding are only example embodiments of the present application and are not intended to limit the scope of the present application.

It is to be understood by those skilled in the art that the term user terminal encompasses any suitable type of wireless user device, for example, a mobile phone, a portable data processing apparatus, a portable web browser, or a vehicle-mounted mobile station.

Generally speaking, various embodiments of the present application may be implemented in hardware or special-purpose circuits, software, logic, or any combination thereof. For example, some aspects may be implemented in hardware while other aspects may be implemented in firmware or software executable by a controller, a microprocessor, or another computing apparatus, though the present application is not limited thereto.

Embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, state setting data, or source codes or object codes written in any combination of one or more programming languages.

A block diagram of any logic flow among the drawings of the present application may represent program steps, may represent interconnected logic circuits, modules, and functions, or may represent a combination of program steps and logic circuits, modules, and functions. Computer programs may be stored in a memory. The memory may be of any type suitable for a local technical environment and may be implemented by using any suitable data storage technology, such as, but not limited to, a read-only memory (ROM), a random-access memory (RAM), and an optical memory apparatus and system (a digital video disc (DVD) or a compact disc (CD)). Computer-readable media may include non-transitory storage media. The data processor may be of any type suitable for a local technical environment, such as, but not limited to, a general-purpose computer, a special-purpose computer, a microprocessor, a digital signal processor (DSP), an application-specific integrated circuit (ASIC), a field-programmable gate array (FGPA), and a processor based on a multi-core processor architecture.

The detailed description of example embodiments of the present application is provided above through exemplary and non-restrictive examples. However, considering the drawings and the claims, various modifications and adjustments to the preceding embodiments are apparent to those skilled in the art and do not deviate from the scope of the present disclosure. Accordingly, the proper scope of the present disclosure is determined according to the claims.

What is claimed is:

1. A signal receiving method, implemented by a user equipment (UE), comprising:

receiving a paging early indication (PEI) signal before a paging occasion (PO), wherein the PEI signal is used for indicating whether the UE receives the PO in a paging cycle, a time domain position of the PEI signal is determined by a distance between the PEI signal and a reference point before the PO, a position of the reference point is determined by a first higher-layer parameter, and the distance between the PEI signal and the reference point is determined by a second higher-layer parameter; and performing a predefined operation based on the PEI signal.

2. The method of claim 1, wherein the predefined operation comprises at least one of:

receiving the PO;

not receiving the PO; or receiving paging downlink control information (DCI).

3. The method of claim 1, wherein the PEI signal comprises an indication of a reference signal resource or a reference signal resource set;

wherein the indication of the reference signal resource or the reference signal resource set comprises one of:

whether the reference signal resource or the reference signal resource set exists;

whether the UE needs to perform blind detection on the reference signal resource or the reference signal resource set; or whether the reference signal resource or the reference signal resource set is updated or activated or deactivated.

4. The method of claim 1, wherein a relationship between the PEI signal and the reference point comprises at least one of the following:

a synchronization signal block (SSB) exists between a starting position of the PEI signal and the reference point;

an SSB exists between an ending position of the PEI signal and the reference point; or an SSB exists between the PO and the reference point.

5. The method of claim 1, further comprising one of:

in response to determining that the PEI signal is not detected on a PEI time-frequency domain resource or that no PEI detection opportunities exist in the paging cycle, receiving, by the UE, the PO;

in response to determining that the PEI signal is not detected on a PEI time-frequency domain resource or that no PEI detection opportunities exist in the paging cycle, not receiving, by the UE, the PO; or in response to determining that the PEI signal is not detected on a PEI time-frequency domain resource or that no PEI detection opportunities exist in the paging cycle, whether the UE receives the PO is determined by a higher-layer parameter.

6. The method of claim 1, further comprising:

in a case where a resource overlap occurs between a PEI time-frequency resource and a non-PEI time-frequency resource, performing a predefined operation based on a resource overlap situation.

7. The method of claim 6, wherein performing the predefined operation based on the resource overlap situation comprises:

receiving a signal with a high priority according to predefined priorities, wherein the predefined priorities comprise at least one of the following cases:

in response to determining that the PEI time-frequency resource overlaps with a physical downlink shared channel (PDSCH) time-frequency resource, a priority of the PEI signal and a priority of a PDSCH are determined by a type of information carried by the PDSCH and a type of a radio network temporary identifier (RNTI) that scrambles a physical downlink control channel (PDCCH) for scheduling the PDSCH; or in response to determining that a resource overlap occurs between the PEI time-frequency resource and a random access response window, a priority of the PEI signal and a priority of an access response are determined by a reason for triggering the random access response window.

8. The method of claim 6, wherein in a case where the PEI signal is indicated by DCI, performing the predefined operation based on the resource overlap situation comprises at least one of:

in response to determining that a resource overlap occurs between the PEI signal and at least one of another signaling or signal, monitoring the PO; or in response to determining that a resource overlap occurs between the PEI signal and at least one of another signaling or signal, determining, based on a higher-layer configuration, whether to monitor the PO.

9. A device, comprising:

at least one processor; and a memory configured to store at least one program;

wherein the at least one program is executed by the at least one processor to cause the at least one processor to perform the method of claim 1.

10. A non-transitory computer readable storage medium, which is configured to store a computer program which, when executed by a processor, causes the processor to perform the method of claim 1.

11. A signal sending method, implemented by a base station, comprising:

sending a paging early indication (PEI) signal before a paging occasion (PO), wherein the PEI signal is used for instructing a user equipment (UE) to perform a predefined operation based on the PEI signal, a time domain position of the PEI signal is determined by a distance between the PEI signal and a reference point before the PO, a position of the reference point is determined by a first higher-layer parameter, and the distance between the PEI signal and the reference point is determined by a second higher-layer parameter.

12. The method of claim 11, further comprising:

in a case where a resource overlap occurs between a PEI time-frequency resource and a non-PEI time-frequency resource, performing a predefined operation based on a resource overlap situation.

\* \* \* \* \*